May 19, 1964

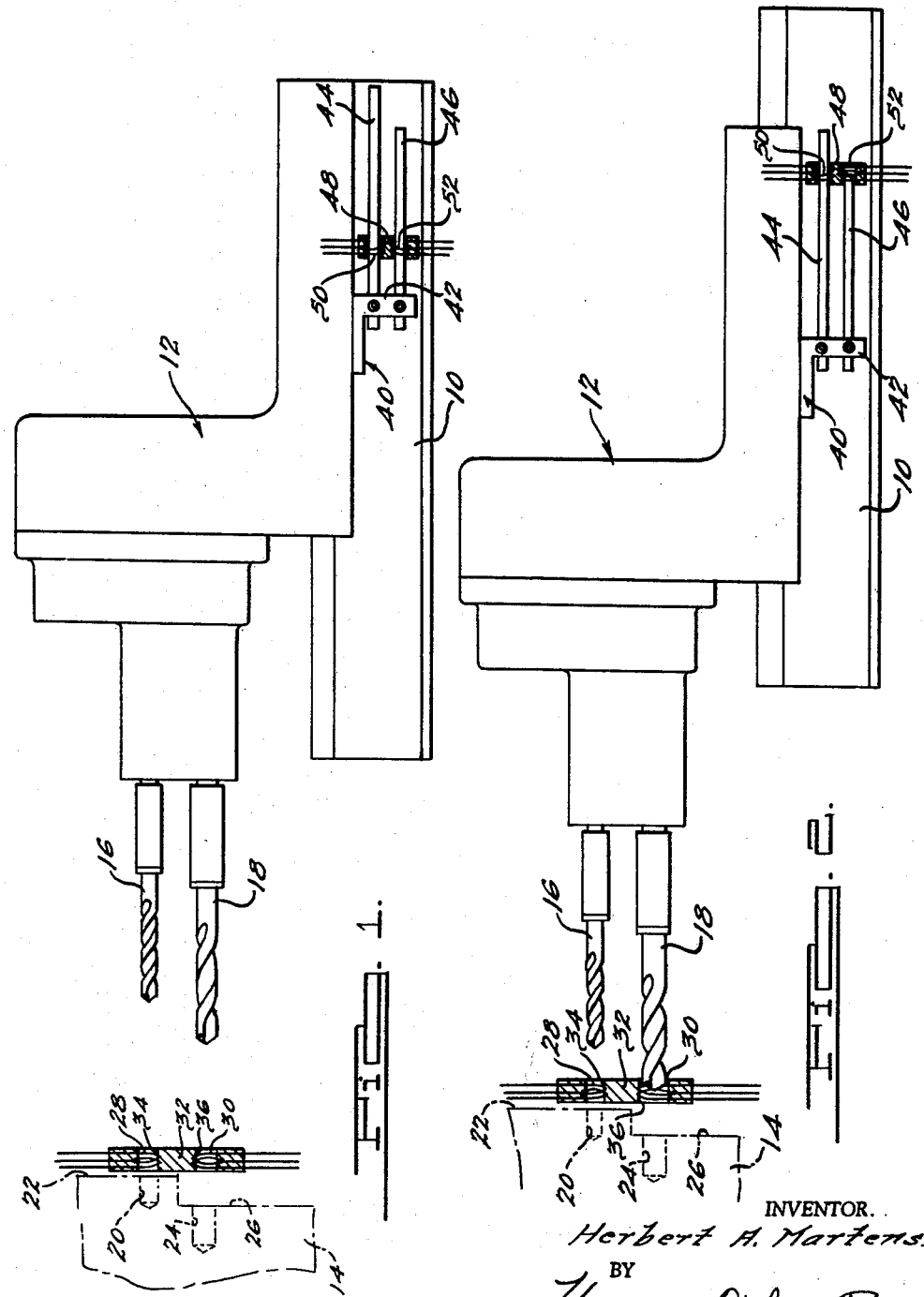

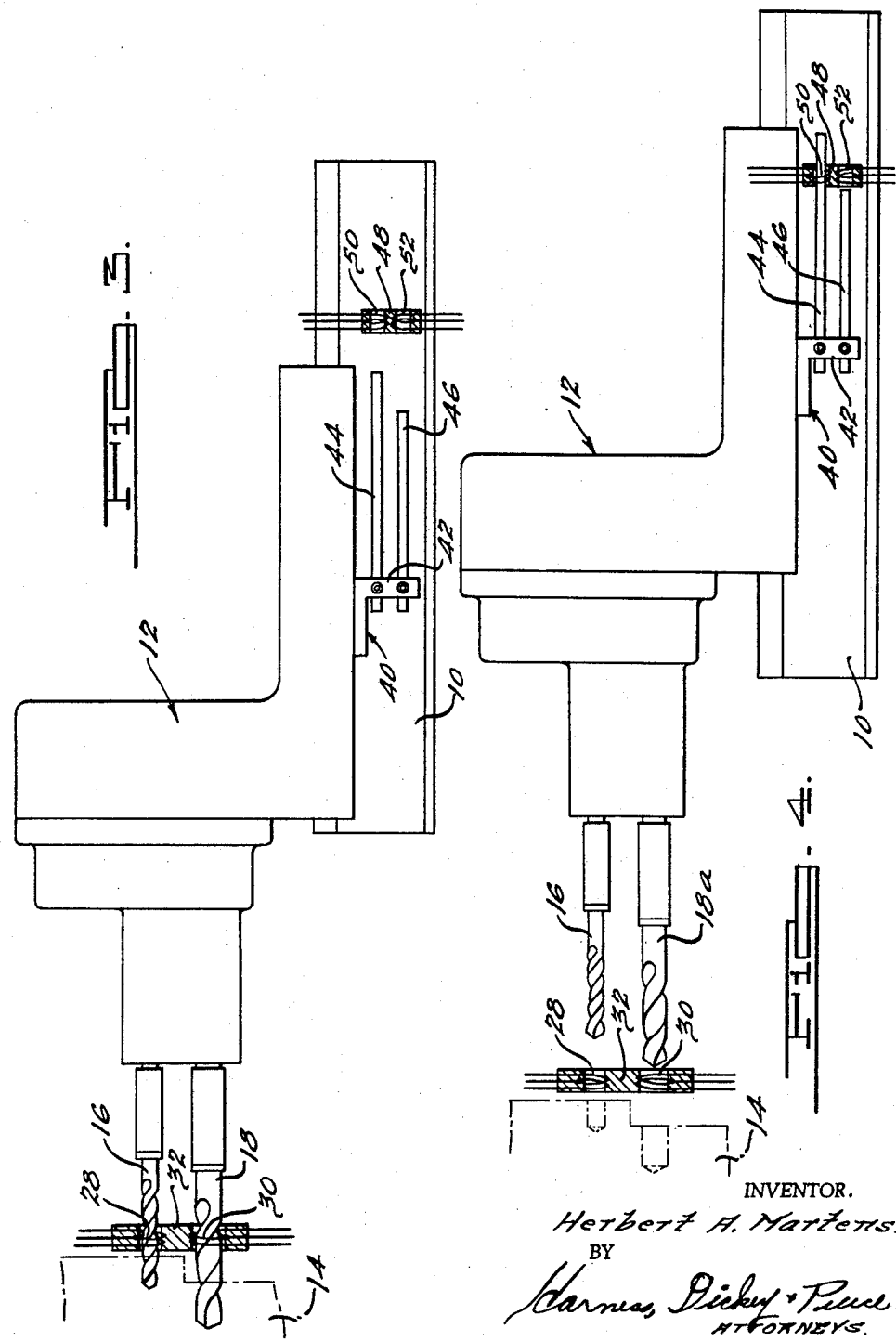

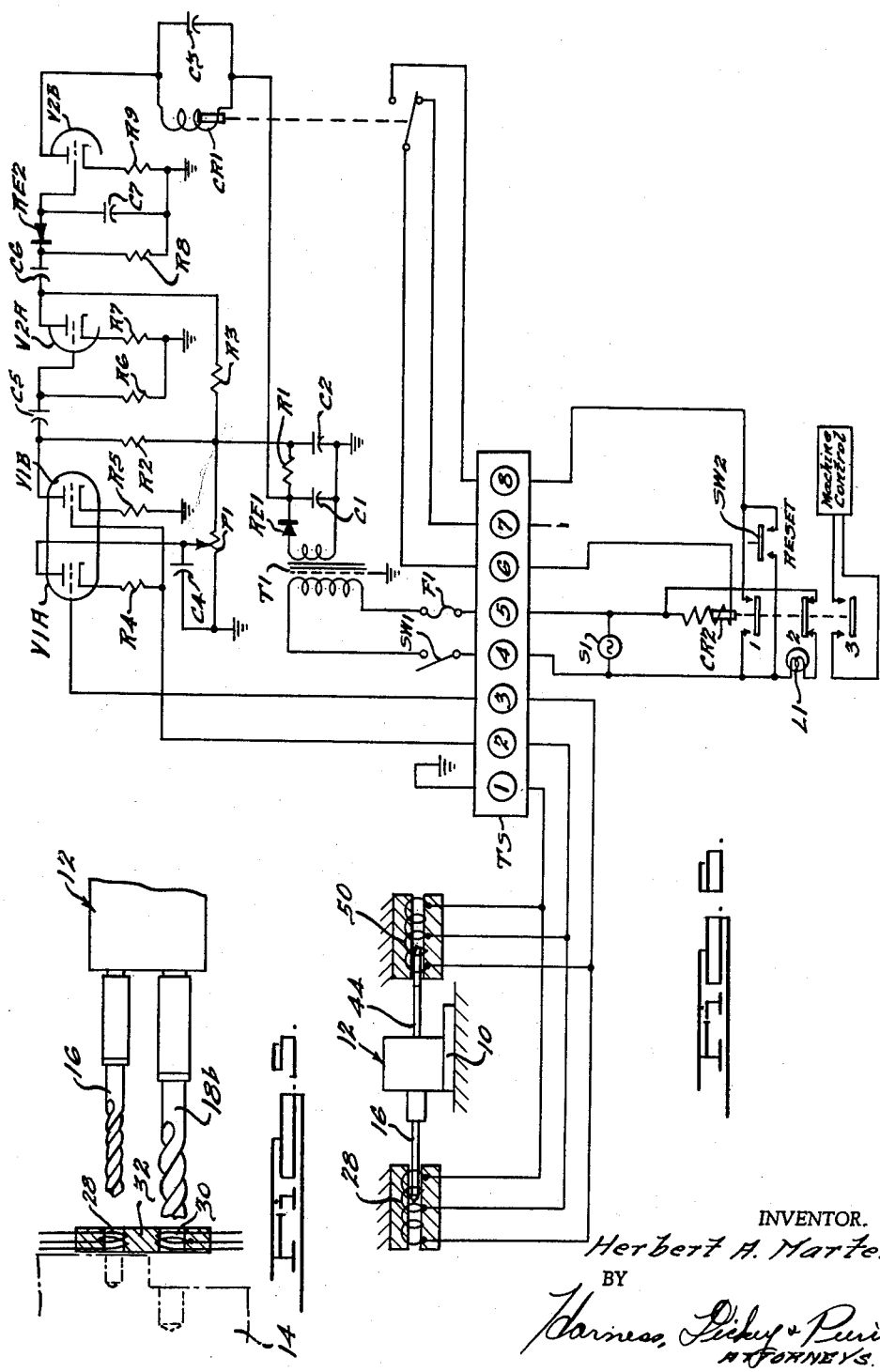

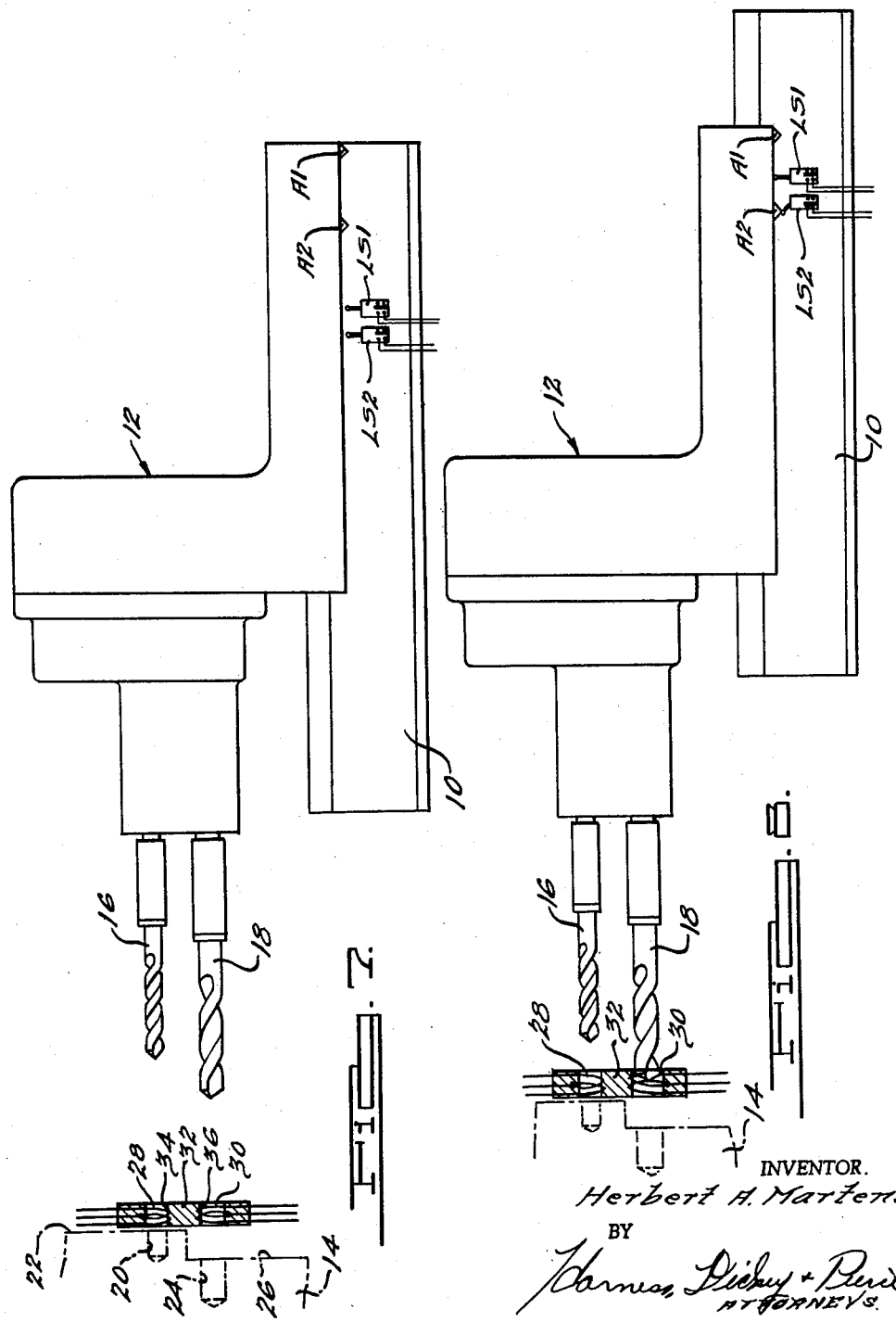

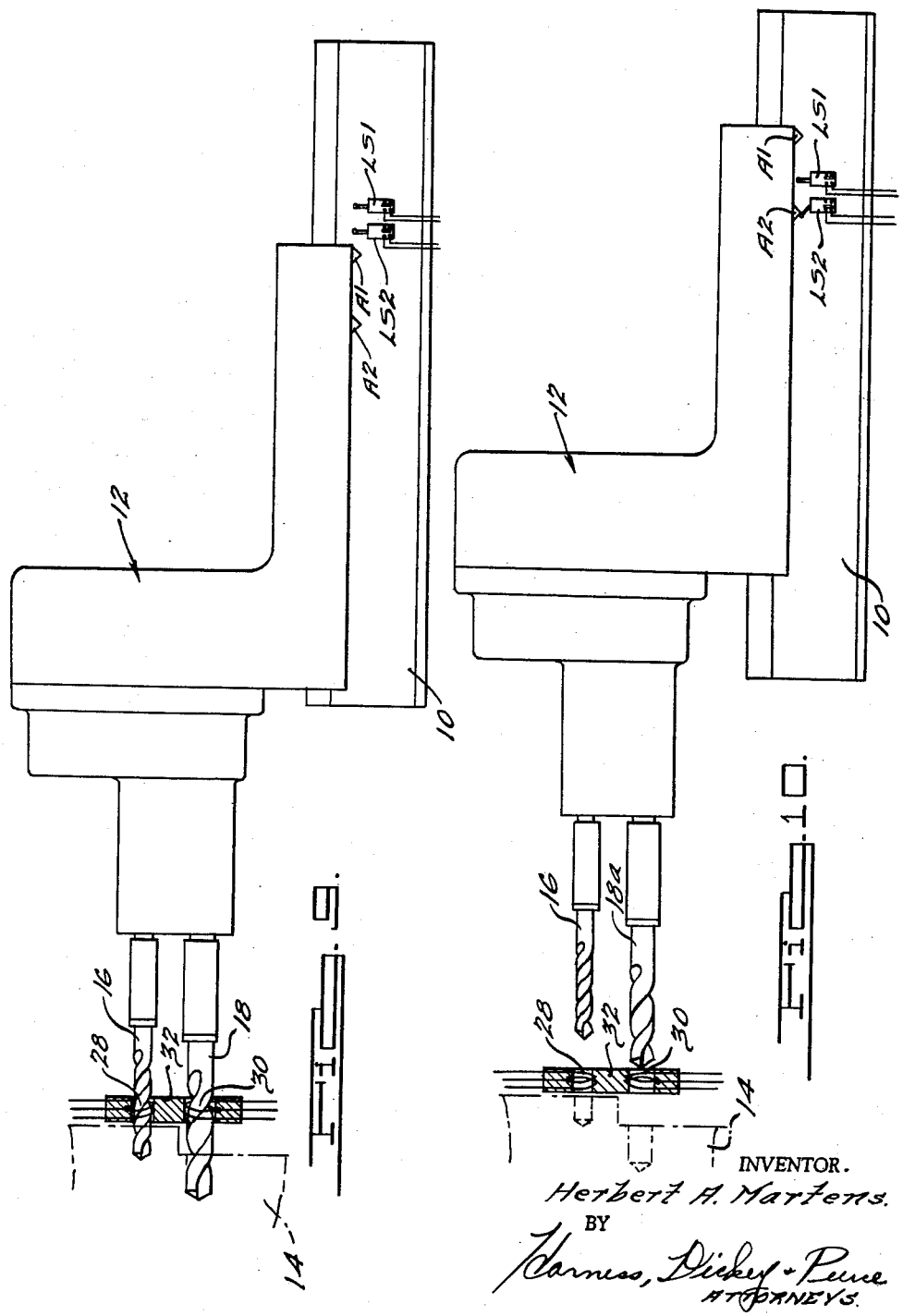

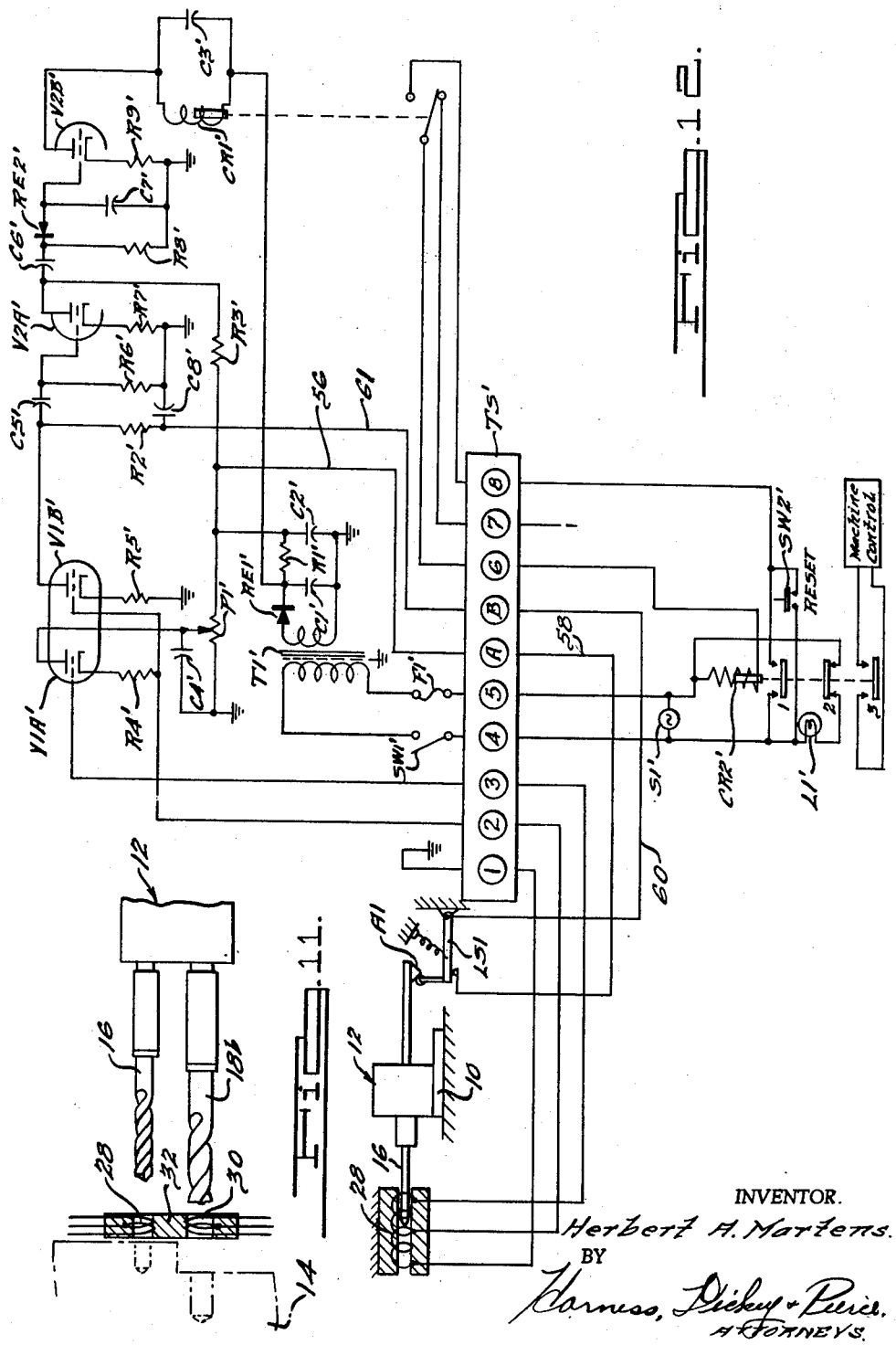

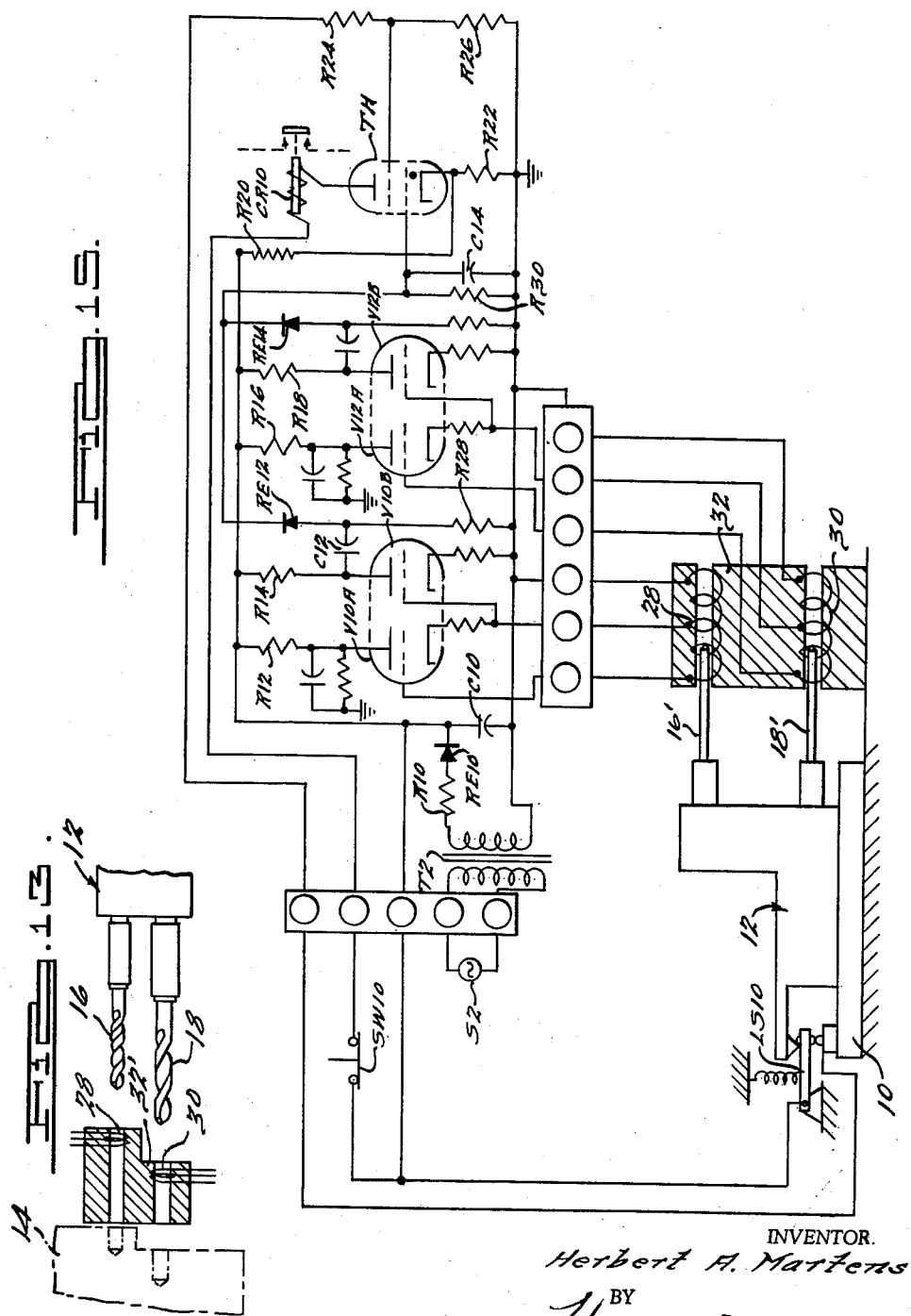

H. A. MARTENS 3,133,457

MULTIPLE TOOL CONDITION DETECTING SYSTEM

Filed March 7, 1960

INVENTOR.
Herbert A. Martens.
BY
Harness, Dickey & Pierce.
ATTORNEYS.

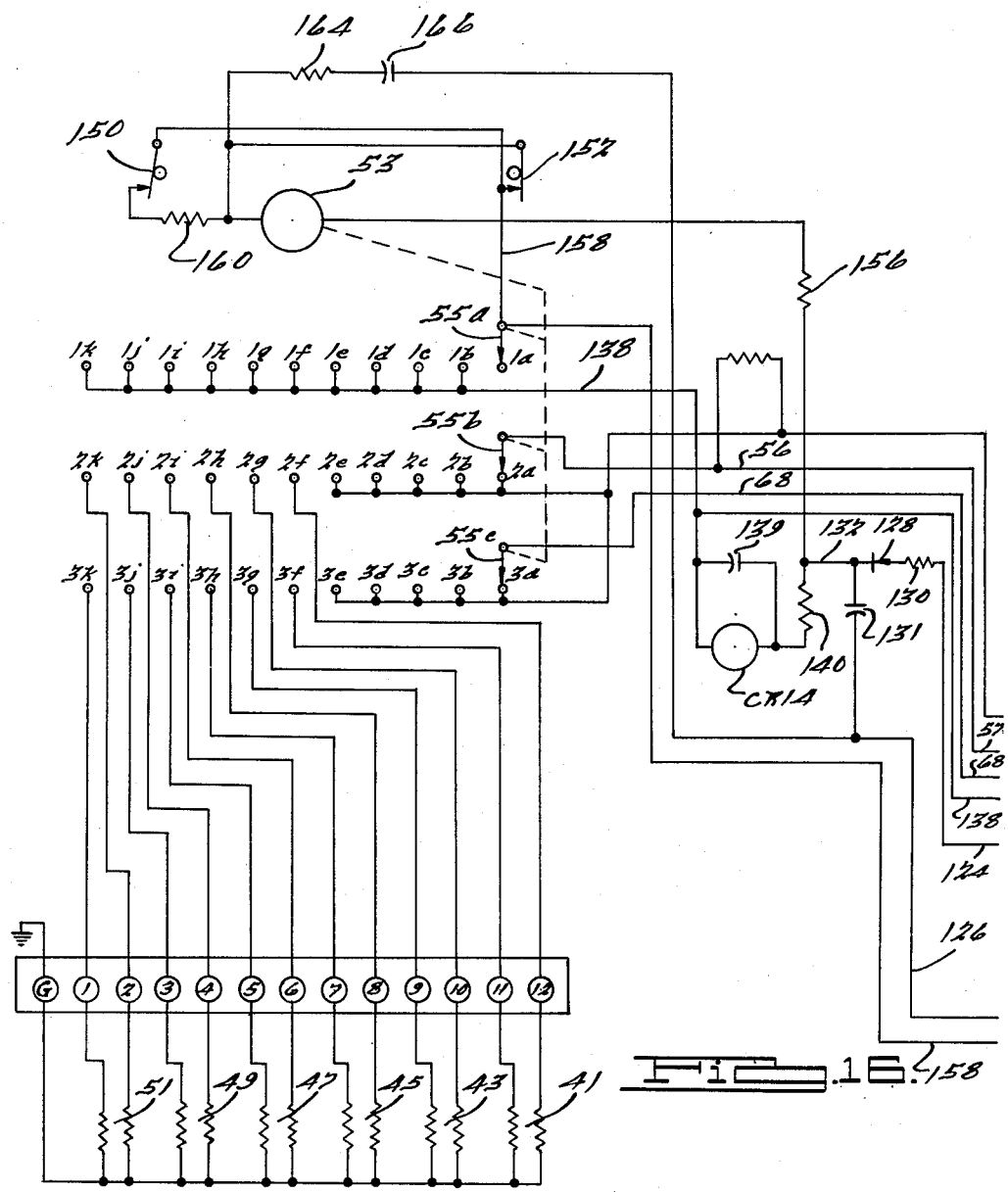

May 19, 1964     H. A. MARTENS     3,133,457
MULTIPLE TOOL CONDITION DETECTING SYSTEM
Filed March 7, 1960     10 Sheets-Sheet 10

INVENTOR.
Herbert A. Martens.
BY
Harness, Dickey & Pierce.
ATTORNEYS.

United States Patent Office 3,133,457
Patented May 19, 1964

3,133,457
MULTIPLE TOOL CONDITION DETECTING SYSTEM
Herbert A. Martens, Birmingham, Mich., assignor to The Cross Company, Fraser, Mich., a corporation of Michigan
Filed Mar. 7, 1960, Ser. No. 13,354
35 Claims. (Cl. 77—5)

This invention relates to tool detectors and more particularly to equipment for association with a machine tool for producing an indication when a cutting tool forming a part of that machine is of improper length or is broken.

This application is a continuation-in-part of the application of Ralph E. Cross and Herbert A. Martens, Serial No. 781,089, filed December 17, 1958, issued as Patent No. 3,025,728, dated March 20, 1962, entitled "Tool Detector."

The principles of the invention are most advantageously applied to automatic machine tools in which cutting operations are repetitively performed on a series of workpieces in an automatic manner and without close and constant supervision by an operator. It has been found, in such machines, that tool breakage is a major contributor to machine down-time. Equipment such as that disclosed in United States Patent 2,679,038, granted May 18, 1954, to R. E. Cross et al. can be utilized to reduce this downtime by reducing the incidence of tool breakage, that equipment serving to shut down the machine whenever any one of the cutting tools thereof has performed a number of operations indicative that tool damage or breakage is likely to occur if the cutting tool is not then replaced. While that equipment, in practice, has measurably reduced the extent of the tool breakage and the extent of downtime, some tool breakage may still occur due, for example, to unusual work loads being imposed upon the tool (as by hard spots in the workpieces) or to defective tools. Further, while the provision of means for presetting the tools to length referenced in the noted patent tends to insure that the tools will be set to proper length, it is not impossible for an operator to improperly set the tools, and particularly it is not impossible for the operator to set the tools too short. The equipment disclosed in the noted patent will not produce a signal or shut down the machine if the cutting tool is of improper length due to improper setting or due to breakage.

Improperly set or broken tools will normally produce defective workpieces and, in the absence of appropriate detecting means, a series of defective workpieces may be produced before the condition is discovered in an automatic operation. Accordingly, an object of the present invention is to provide means for producing a signal or output indication or to shut down the machine tool if any one of the cutting tools forming a part thereof is of improper length or broken.

The principles of the invention have been representatively disclosed in conjunction with a machine tool for drilling one or more holes in a workpiece. The machine tool includes a base and a head supported upon and movable with respect to the base. The head includes one or more cutting tools which are carried by the head from a position spaced from the workpiece to a position in which the cutting tools are in cutting engagement with the workpiece. A sensing means for each cutting tool is disposed in the path of travel of that cutting tool so as to be disposed in sensing relationship with portions of the cutting tool during all or a part of the travel of the cutting tool between the noted positions. In the preferred arrangement, this sensing means comprises an inductor in the form of a coil of wire positioned between the head and the workpiece and positioned so that each drill, in advancing toward the workpiece will enter and pass through the sensing coil. While the sensing coil may be supported in any suitable fashion, in the illustrated arrangement it is mounted upon a bushing plate which is positioned proximate the workpiece and which further serves the function of guiding the drills. In some machine tools, such bushing plates are fixed in a position adjacent the transfer device or conveyor system which advances the workpieces successively into position for drilling. In other machines, the bushing plate is movable toward and away from the workpiece for various reasons such as for establishing clearances preliminary to indexing the workpiece, and the subject sensing means can be associated with either of those types of bushing plates.

The inductance coil is disclosed as forming a pair of an oscillatory circuit in a control means which serves, in effect, to produce one indication if no cutting tool is contained within the sensing coil and a different indication if the metallic cutting tool is disposed within the sensing coil. In one arrangement in which the sensing means is disposed in sensing relationship with the cutting tool only during a part of the travel of the cutting tool, the control means (including the sensing means) is energized only at selected times in the operation of the machine tool. In another arrangement in which the sensing means is continuously in sensing relationship with the cutting tool, the control means is or may be continuously energized or enabled. The control means senses the presence or absence of a cutting tool within the coil to detect when a trouble condition has arisen.

In the disclosed arrangements in which the control means is energized at selected times during the operation of the machine tool, two types of means are disclosed for insuring that the sensing of tool length will occur only at the appropriate times. In one form, one or more limit switches are each supported on the machine tool base in a position to be tripped by an actuator mounted upon the head. In another form, one or more inductance coils are each mounted upon the base in a position to accept a metallic rod secured to the head. The position of the rod, the length of the rod, and the position of the inductance coil are so selected that the end of the rod will depart from sensing relationship with its associated inductance coil at the same time that a cutting tool of proper length is entering its associated sensing coil. Both inductances are included in the oscillatory circuit and an output trouble indication is produced at any time that neither of the two inductance coils is in sensing relation with the associated metallic elements.

Means are also disclosed for controlling a single output device in accordance with the condition of each of a plurality of cutting tools upon a single machine tool.

A more detailed understanding of the principles of the invention may be obtained from the following detailed description of embodiments of the invention when read with reference to the accompanying drawings in which:

FIGURE 1 is a side elevational view of a machine tool in association with a cutting tool sensing means and means for detecting a critical position of the machine tool head with respect to the base, the head being shown in a fully retracted position;

FIG. 2 is a view of the structure of FIG. 1 in an intermediate position of advance of the head with respect to the base;

FIG. 3 is a view of the machine of FIG. 1 with the head in an advanced position;

FIG. 4 is a view of the machine of FIG. 1 at a critical position of the advance of the head with respect to the base and in which one of the cutting tools has been set too short;

FIG. 5 is a fragmentary view of the machine of FIG.

Figure 14:
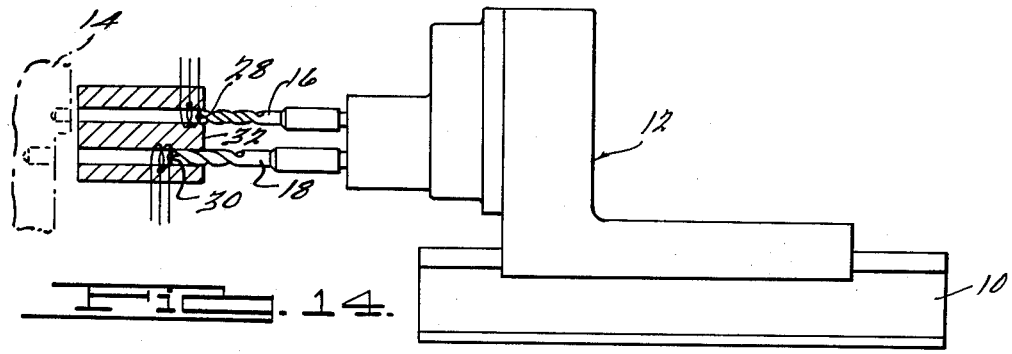
Figure 18:
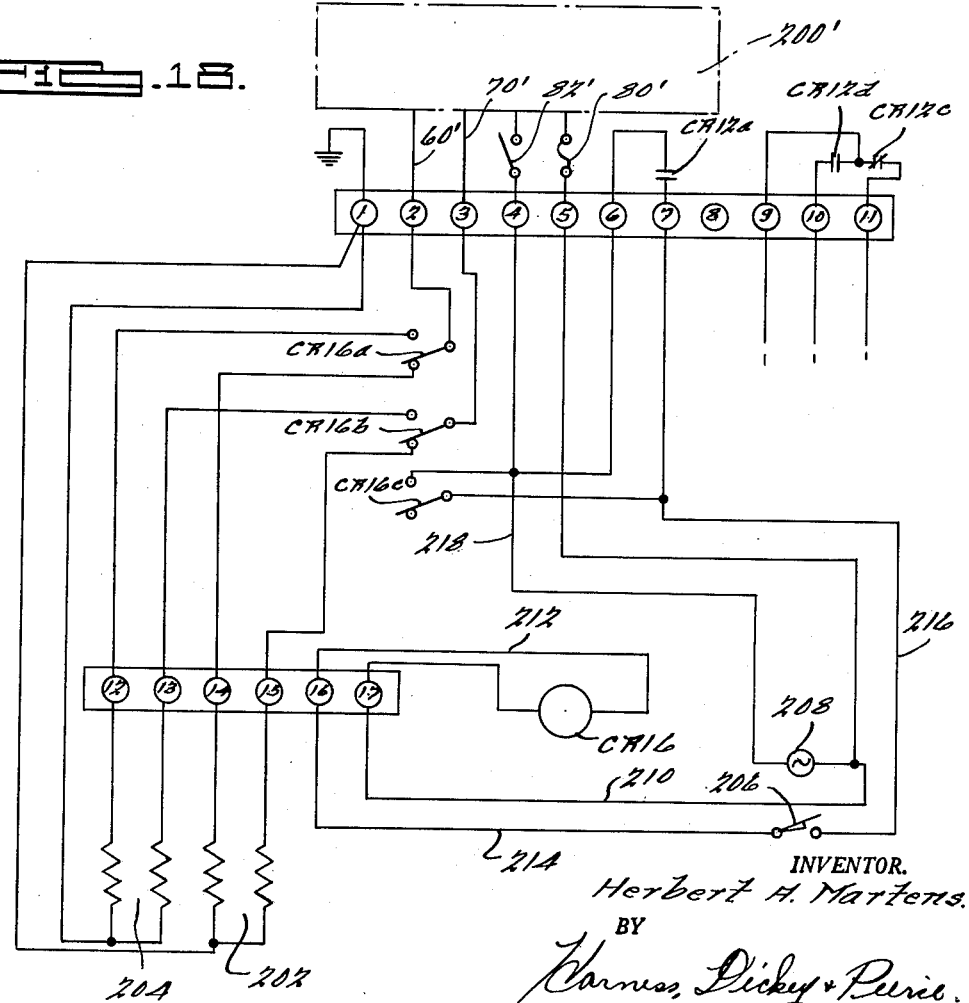
Figure 17:
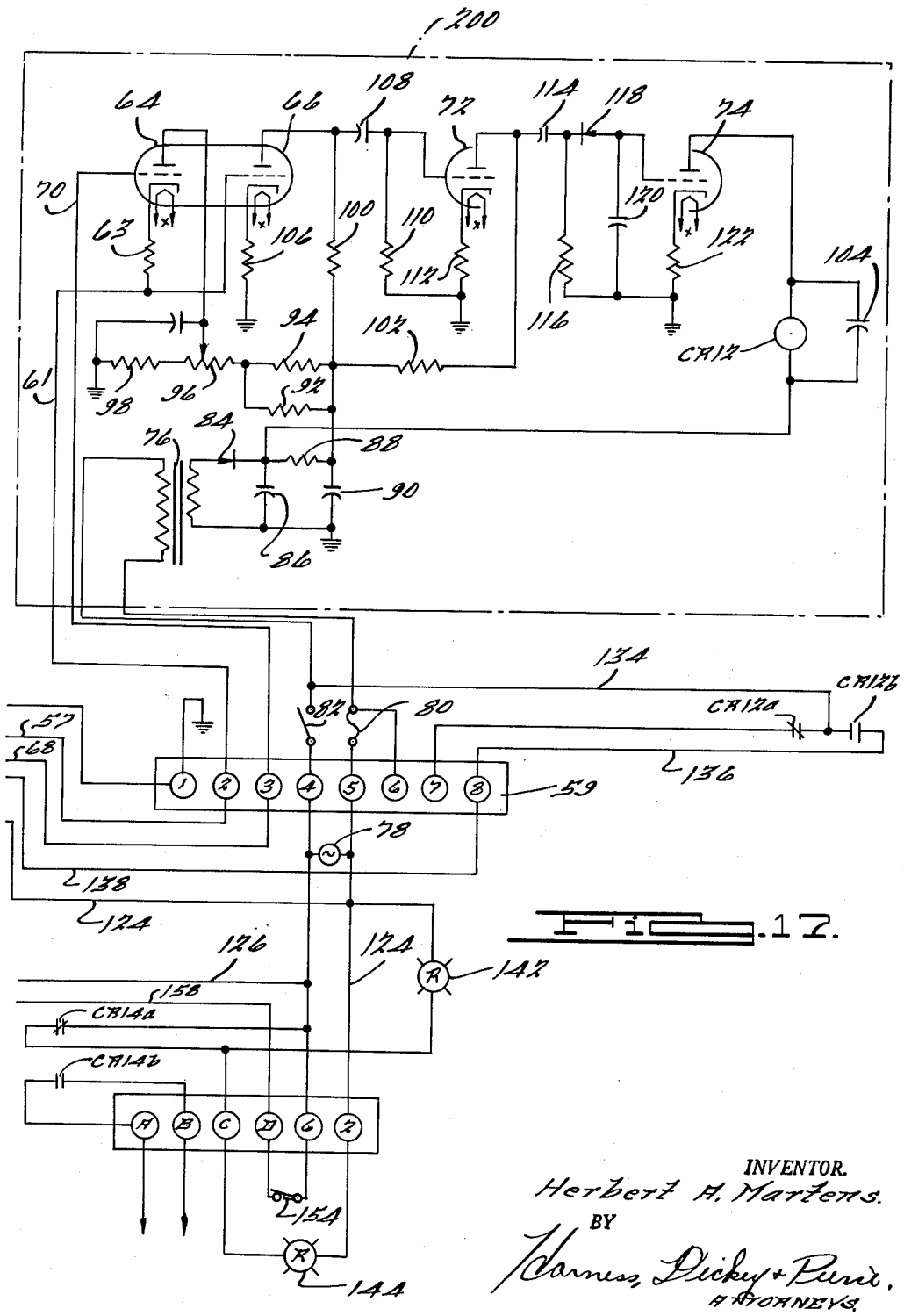

1 in the positional relationship of FIG. 4 and in which one of the cutting tools is broken;

FIG. 6 is a schematic representation of an electrical control equipment including the sensing means and the position-detecting means of FIGS. 1 through 5;

FIG. 7 is a side elevational view of a machine tool similar to that of FIG. 1 but with modified position-detecting means, the head being shown in a retracted position;

FIG. 8 is a view of the machine of FIG. 7 with the head being shown in an intermediate position of advance;

FIG. 9 is a view of the machine of FIG. 7 with the head being shown in an advanced position;

FIG. 10 is a view of the machine of FIG. 7 with the head being shown in the position of FIG. 8 but in which one of the cutting tools is set too short;

FIG. 11 is a view of the machine of FIG. 7 in the position of FIG. 8 but in which one of the cutting tools is broken;

FIG. 12 is a schematic representation of another form of control equipment for association with the machine tool of FIGS. 7 through 11;

FIG. 13 is a fragmentary view of a modified arrangement in which the sensing coils are located in accordance with the appropriate lengths of the associated drills;

FIG. 14 is a view of a modified arrangement in which the sensing coils are in continuous sensing relation with correct tools;

FIG. 15 is a schematic representation of a control equipment for use with a plurality of cutting tools;

FIG. 16 is a schematic representation of a portion of a control equipment for use with the apparatus of FIG. 14;

FIG. 17 is a schematic representation of another portion of the equipment of FIG. 16; and FIG. 18 is a schematic representation of another control equipment.

Those elements of a representative machine tool which are significant to the practice of the principles of the present invention are illustrated in FIG. 1 of the drawings. The machine tool there shown comprises a base 10 slidably supporting a head 12 for movement in translation toward and away from a workpiece 14. The head 12 carries a plurality of cutting tools representatively illustrated as drills 16 and 18 which, in the normal manner, are mounted in individual spindles for individual rotation relative to the workpiece 14. In the illustrated arrangement, drill 16 is adapted to drill a hole 20 in a face 22 of the workpiece 14 while drill 18 is adapted to drill a larger diameter hole 24 in an offset face 26 of the workpiece 14. The nature of these cutting tools and their relationship to the workpiece are, of course, purely representative.

An inductance coil 28, preferably annular in configuration and having a central aperture larger in diameter than drill 16, is mounted adjacent workpiece 14 coaxially with the drill 16, and an inductance coil 30 is similarly associated with drill 18. Inductance coils 28 and 30 are supported by a member 32 which is normally fixed in position relative to the workpiece 14 and relative to the base 10. Member 32 is provided with apertures 34 and 36 adapted to accept drills 16 and 18 respectively. Member 32 may be made of insulating material with the inductance coils 28 and 30 being imbedded in the walls of the apertures 34 and 36 or those inductance coils may be wound about individual bobbins which are mounted as inserts in the member 32. It is preferred that no ferrous element be interposed the coils and the drills when the drills are within the apertures 34 and 36.

In many machine tools of this nature, a bushing plate is mounted proximate the workpiece which serves to guide and support the drills. It is contemplated that the inductance coils 28 and 30 be mounted upon bobbins which serve as the bushing elements of such a bushing plate. In certain such equipment, the bushing plate is moved relative to the workpiece preliminary to or as an incident of the drilling operation, particularly in circumstances where the surface of the workpiece which is to be drilled is recessed relative to other surfaces of the workpiece. In those cases, in order to position the bushing plate close to the surface to be drilled while yet insuring that the bushing plate does not interfere with movement of the workpiece to and from the work station, it is necessary to move the bushing plate towards the workpiece preliminary to or during the drilling operation. The features of the present invention can be applied to such an arrangement, the only requirement (in this embodiment) being that the tips of the drills be moved into proper sensing relationship with the sensing coils at some point during their travel into engagement with the workpiece and that the positional relationship between the bushing plate and the base be consistent from operation to operation at the instants that the tips of the cutting tools enter the bushing plate. This requirement is met, of course, by an arrangement in which the type of the drills are in proper sensory relationship with the sensing coils at the fully retracted position of the head.

In the view of FIG. 1, the head 12 is withdrawn so that the drills 16 and 18 are spaced from the workpiece 14 and from the member 32. After the workpiece is in position, the head 12 is advanced toward the workpiece. During the course of this movement, the longer of the two illustrated drills 18 will enter the aperture 36 and come into sensing relationship with the inductance coil 30. This condition in the advance of the head toward the workpiece is illustrated in FIG. 2 of the drawings. As the head continues to advance, the point will be reached at which the drill 16 enters the aperture 34 and comes into sensing relationship with the inductance coil 28. As the head advances further, the drills are brought into cutting engagement with the workpiece 14 and form the holes 20 and 24, the position of the equipment at the end of this drilling operation being indicated in FIG. 3 of the drawings.

The inductance coils 28 and 30 are, in the illustrated arrangement, air core inductors. Since the cutting tools 16 and 18 have an iron content, they will serve as elements of the flux-return paths as they enter the inductance coils so as to modify the reluctance of the flux-return paths and the effective inductance of those coils. As a result, the effective inductance of the coils 28 and 30 will be different when no tool is in sensing relationship therewith than it is when the iron-containing tools are disposed therewithin. This change in inductance is sensed by equipment to be described to provide an indication as to whether, at any selected time, a cutting tool is or is not disposed in sensing relationship with the inductance coils.

As noted, the tip of each of the cutting tools enters the associated aperture in the member 32 and comes into sensing relationship with the individual coil 28 or 30 at one point in the travel of the tool toward the workpiece. It is at this region that the sensing operation is preferably performed, for if the tool has advanced further toward the workpiece, an indication that a portion of the cutting tool is in sensing relation with the sensing coil would not necessarily preclude the possibility that the extreme tip of the tool was broken or was of improper length. Consequently, the equipment is arranged so that if it is to be determined whether the cutting tool is set short or broken, the sensing operation occurs at the instant that the tip of a correct length, unbroken cutting tool reaches sensing relationship with the sensing coil. Drill 18 is shown in this position in FIG. 2 of the drawings. This condition exists, with a proper length, unbroken cutting tool, at a fixed position of the head 12 in its movement toward the workpiece which may be the fully retracted position. Therefore, the sensing operation can be initiated under the control of the position of the head 12 relative to the base 10, the arrival of the head 12 in the preselected positional relationship with respect to the base 10 being detected by means associated with both the head and the base. This means, in the embodiment of FIGS. 1 through 5 comprises one or more inductance coils associated with one or more rods, whereas this means, in the embodiment of FIGS. 7 through 11, takes the form of one or more limit switches and cooperating actuators.

In the embodiment of FIG. 1, a bracket 40 having a depending arm 42 is secured to the head 12 so as to move therewith and carries rods 44 and 46 whose axes are horizontal and parallel with the line of motion of the head. A member 48, secured to the base 10, is provided with apertures accepting rods 46 and 44 and supports the inductance coils 50 and 52 adjacent those apertures.

Rod 46 is individual to tool 18 and rod 44 is individual to cutting tool 16. Rod 46 is positioned so that its tip leaves its associated coil 52 at the instant that the tip of the drill 18 enters coil 30, this condition being illustrated in FIG. 2 of the drawings. Correspondingly, rod 44 is chosen in length and position so that its tip leaves the associated inductance coil 50 at the instant and position that the tip of drill 16 enters sensing coil 28. This condition will exist at a point in the travel of the head 12 between the FIG. 2 and FIG. 3 positions.

As will be seen hereinafter, control means is provided for sensing the conjoint inductance of inductance coils 28 and 50, and control means is provided for sensing the conjoint inductance of inductance coils 52 and 30. The control means is adjusted so that an indication of a defective condition will not be produced unless at some instant during the travel of the head neither of the inductance coils 50 and 28 or neither of the inductance coils 52 and 30 has a ferrous element therewithin. In the FIG. 1 position of head 12, both coils 50 and 52 have the metallic rods 44 and 46 (which have an iron content) therewithin so that no trouble condition will be indicated even though neither drill 16 nor 18 is disposed within its associated coil 28 or 30. Similarly, when the head 12 is advanced to the FIG. 3 position, no trouble indication will be transmitted because drills 16 and 18 are disposed within coils 28 and 30, respectively, even though rods 44 and 46 have been withdrawn from their respective coils 50 and 52. At the position illustrated in FIG. 2 of the drawings, the effective inductance of coil 52 is changing inasmuch as rod 46 is being withdrawn therefrom. However, the effective inductance of coil 30 is at the same instant changing in the opposite direction due to the fact that the unbroken drill 18 is entering coil 30. Consequently, there is no effective change of the conjoint inductance of coils 30—52. Similarly, as head 12 advances further to the left from the FIG. 2 position, no trouble indication will be produced at the instant that the tip of rod 44 leaves coil 50 for the reason that the tip of drill 16 is at that same instant entering coil 28.

If one of the drills 16 or 18 is subsequently replaced (due for example to its becoming dull) with a drill which is set too short, a trouble indication should properly be produced. This condition is represented in FIG. 4 of the drawings, in which it is assumed that drill 18 has been replaced with a drill 18a which is shorter than drill 18. Since drill 18a is too short, at the instant that the tip of rod 46 leaves coil 52, the tip of drill 18a will not as yet have entered coil 30 so that at this instant neither of the coils 52—30 contains a metallic element and, as was noted, this is the condition which causes the control means to produce a trouble indication. Similarly, if the tool 18a is subsequently replaced with a tool 18b which breaks, as illustrated in FIG. 5 of the drawings, no portion of the tool 18b will be disposed within the coil 30 at the instant that the rod 46 leaves coil 52, again establishing the condition for producing a trouble indication.

It will be observed that in the disclosed arrangement rods 44 and 46 differ in length in accordance with the difference in length of the drills 16 and 18, the requirement being that the distance between the coil 50 and the tip of rod 44 be equal to the distance, at that instant, between the tip of drill 16 and coil 28, and that the distance between coil 52 and the tip of rod 46 be equal, at that instant, to the distance between the coil 30 and the tip of drill 18. It will be apparent that equal length rods 44 and 46 could be employed if the extent to which those rods project to the left (FIG. 1) of bracket 42 is properly varied or if they were supported by separate brackets 40. Similarly, it will be apparent that the coils 50 and 52 could be spaced axially from one another upon the base 10 by a distance equal to the distance between the tips of the drills 16 and 18 in which case the tips of the rods 44 and 46 could be aligned, or that any combination of these modifications could be utilized. It will also be apparent that it is not significant whether the coils be secured to the base and the rods travel with the head 12, as shown, or whether these relationships be reversed.

In order to sense the conjoint inductance of the pairs of sensing and position-detecting coils such as the pair of coils 28—50, the control means must be capable of detecting changes in the total effective inductance of these two coils, and to that end the control means illustrated in FIG. 6 of the drawings comprises an oscillatory circuit of which the two coils 28 and 50 form a part. In the diagrammatic illustration of FIG. 6, rod 44 is shown to be connected to one end of the head 12 for convenience and the means for supporting inductance coil 50 has been shown spaced from the base 10.

In the illustrative arrangement disclosed, the inductance coils 28 and 50 are each center tapped and the resulting three terminals of each of the two coils are interconnected so that the coils 28 and 50 are connected in parallel. Vacuum tube V1A serves as the energy-supplying means of the oscillatory circuit including the coils 28 and 50, vacuum tube V1B and vacuum tube V2A serve as amplifying means and vacuum tube V2B controls the output relay CR1 which in turn controls relay CR2 to perform the output function.

The D.C. power supply for the several vacuum tubes comprises a transformer T1 having a primary winding which is connected to source S1 of alternating voltage, that primary circuit being fused with fuse F1 and selectively energizable under the control of switch SW1. The alternating voltage appearing across the secondary winding of transformer T1 is half-wave rectified by rectifier RE1 to produce a direct voltage across filter capacitor C1. This voltage is further filtered by means of the network including resistor R1 and capacitor C2. The direct voltage appearing across capacitor C2 is applied across the resistive element of potentiometer P1, the slider of that potentiometer being connected to the anode of tube V1A. The voltage appearing across filter capacitor C2 is also applied through load resistor R2 to the anode of vacuum tube V1B and through load resistor R3 to the anode of vacuum tube V2A. The direct voltage appearing across capacitor C1 is applied through the winding of control relay CR1, which winding is shunted by capacitor C3, to the anode of triode V2B.

The cathode of the oscillatory circuit triode V1A is connected to ground through degenerative feed-back resistor R4, No. 2 terminal of terminal strip TS, through the right-hand halves of coils 28 and 50 in parallel, and the No. 1 terminal of terminal strip TS. The control grid of triode V1A is connected to the left-hand terminals of coils 28 and 50. The anode of tube V1A is connected to the positive direct potential as above noted and is further connected to ground through bypass capacitor C4.

It will be seen that triode V1A is connected as a Hartley type of feed-back oscillator. While the resonant circuit including inductances 28 and 50 may also include additional lumped inductance and lumped capacitance, it is assumed that the capacitance of the conductors extending to the coils 28 and 50 in the illustrated showing serves to cause the circuit to oscillate at an appropriate frequency. The circuit is arranged so that tube V1A is normally quiescent, the circuit breaking into oscillation only if, at some instant of time, no portion of rod 44 is disposed within coil 50 at the same instant that no portion of tool 16 is disposed within coil 28.

When such oscillation occurs, the alternating voltage signal appearing between the No. 2 terminal of terminal strip TS and ground, that is, the alternating voltage signal appearing across the right-hand halves of coils 28 and 50, is applied between the control grid of amplifier V1B and ground. Since the anode of that tube is energized as aforesaid and since the cathode of that tube is connected to ground through resistor R5, an amplified alternating voltage is developed across load resistor R2 which is applied to vacuum tube V2A through the coupling network comprising capacitor C5 and resistor R6. The cathode of amplifier V2A is connected to ground through resistor R7 and the tube operates as an amplifier, producing an amplified alternating voltage across load resistor R3. This alternating voltage is applied through capacitor C6 and developed across resistor R8. The alternating voltage across resistor R8 is half-wave rectified by means of rectifier RE2, filtered by means of capacitor C7, and applied to the control grid of tube V2B the cathode of which is connected to ground through resistor R9. Tube V2B is normally conducting, the anode current thereof flowing through the winding of relay CR1 so that relay CR1 is normally operated. Rectifier RE2 is poled so that the direct voltage which is applied between the control grid of tube V2B and ground in response to the rectification of the alternating voltage signal is negative, tending to drive tube V2B to or toward cutoff, thereby reducing the flow of plate current to the point where relay CR1 will release.

When the circuit is placed in operation by the closure of switch SW1, assuming a proper tool to be disposed in the head 12, relay CR1 operates to close its normally open contacts and to prepare an energizing circuit for relay CR2 which may be traced from the right-hand terminal of source S1, winding of relay CR2, No. 6 terminal on terminal strip TS, the normally open contacts of relay CR1, the No. 8 terminal on terminal strip TS, and to one contact of the switch SW2, as well as to one contact of the No. 1 contacts of relay CR2, the other contacts of both of which are connected to the left-hand terminal of source S1. Since the No. 1 contacts of relay CR2 and switch SW2 are both open at this time, relay CR2 will not operate even though relay CR1 is operated. However, when switch SW2 is momentarily depressed to close the contacts, the energizing circuit for relay CR2 is completed and the No. 1 contacts thereof are closed so that relay CR2 is locked operated under the control of relay CR1 even though reset button SW2 is released.

Relay CR2, in operating, opens its No. 2 contacts to extinguish the lamp L1 to indicate that the circuit is now ready for operation and closes its No. 3 contacts to energize the machine control. The machine control is the equipment for controlling the machine tool including the head 12 and may take any suitable form. It may be observed that the No. 3 contacts of relay CR2 may be employed in conjunction with the circuitry illustrated in the above-identified patent to control the starter of the machine tool. Thus, the starter of the machine tool in the noted patent is identified 182 in that patent and the No. 3 contacts of relay CR2 may be connected in series with that starter as by opening lead 192 or 194 in FIG. 3 of the above-identified patent and inserting the No. 3 contacts of relay CR2 of the subject application therein. The output relays of the other arrangements disclosed herein may be connected in the system of the noted patent in a similar fashion.

If during the operation of the equipment, a condition exists in which rod 44 is out of coil 50 at the same instant that no portion of tool 16 is within coil 28, the oscillatory circuit will break into oscillation, the plate current of tube V2B will be reduced, and relay CR1 will be released. When this occurs, relay CR1 will open its normally open contacts (closing its normally closed contacts to establish a signal condition between the No. 6 and No. 7 terminals of terminal strip TS for any appropriate purpose) to terminate energization of relay CR2. Relay CR2, in releasing, closes its No. 2 contacts to energize lamp L1 to indicate the existence of a trouble condition, and opens its No. 3 contacts to shut down the machine by appropriately signaling the machine control. If, shortly thereafter, some portion of tool 16 enters coil 68 or some portion of rod 44 enters coil 50, the oscillator will again be rendered quiescent, and relay CR1 will again be operated, but since the energizing circuit for relay CR2 is interrupted due to the fact that the No. 1 contacts of relay CR2 are opened at the same time that switch SW2 is opened, relay CR2 cannot reoperate and the existence of a trouble condition will continue to be indicated. When the operator has corrected the condition, as by replacing the tool, the equipment can again be placed in operation by momentary closure of switch SW2.

It will be observed that similar equipment can be associated with the sensing and position-determining coils 30 and 52, with the No. 3 contacts of the CR2 relay in that circuit desirably being connected in series with the No. 3 contacts of relay CR2 in the circuit of FIG. 6 so that a defective condition with respect to either of the two illustrated cutting tools will cause the machine tool to be shut down.

In the modified arrangement illustrated in FIGS. 7 through 11 of the drawings, the head, the base, the drills, the workpiece, and the drill sensing means are the same as those above discussed and bear similar designations. However, in this arrangement, in lieu of the head-position detecting coil and rod arrangement, limit switch means are employed to selectively energize the sensing and/or control means at appropriate points in the movement of the head 12.

In the illustrated arrangement, limit switches LS1 and LS2 are mounted upon the base 10 and cooperating actuators A1 and A2 are secured to and are moved by the head 12. Limit switch LS1 and its actuator A1 are individual to the drill 16, while limit switch LS2 and its actuator A2 are individual to the drill 18. The actuating levers of the limit switches LS1 and LS2 are offset from one another in a horizontal sense and transversely of the machine and the actuators or dogs A1 and A2 are correspondingly offset so that actuator A2 will not engage or actuate limit switch LS1 and so that actuator A1 will not engage or actuate limit switch LS2.

Since drill 18 is illustrated to be longer than drill 16, limit switch LS2 will be actuated before limit switch LS1. As the head 12 moves from the FIG. 7 position into the FIG. 8 position, actuator A2 is moved with the head into actuating relationship with the lever of limit switch LS2 producing, in the illustrated arrangement, a closure of those limit switch contacts. Limit switch LS2 and actuator A2 are adjusted so that this contact closure occurs at the instant and position that the tip of a proper length and unbroken drill 18 is just entering coil 30. As a result, the control means including the sensing coil will detect the presence of the metallic drill within the coil and will not transmit a trouble indication.

As the head 12 advances further to the left, limit switch LS2 will be released, and at a still further position of advance, actuator A1 will trip limit switch LS1 to produce closure of its contacts. Again, limit switch LS1 and actuator A1 are adjusted so that this contact closure occurs just as the tip of a proper length and unbroken drill 16 enters coil 28, and again there will be no trouble indication transmitted. As the head 12 advances still further to the left towards and to the FIG. 9 position, limit switch LS1 is released.

If, when the limit switch LS2 is actuated the tool 18a which is then associated with head 12 is too short, as illustrated in FIG. 10, the control means will detect the absence of a metallic object within the coil 30 and will produce a trouble indication. Similarly, at the same position of the head 12, if the tool 18b which is then in the head 12 is broken, as illustrated in FIG. 11, a trouble indication will also be transmitted.

It will be observed that in both illustrated arrangements, a test of the condition of the tool will be made both upon the forward and upon the return stroke of the head.

A control means suitable for use in conjunction with the equipment illustrated in FIGS. 7 through 11 of the drawings is shown schematically in FIG. 12. In that view, the left-hand terminal of sensing coil 28 is connected to ground through the No. 1 terminal of terminal strip TS', the right-hand terminal of that coil is connected via the No. 3 terminal of terminal strip TS' to the control grid of vacuum tube V1A' and the center tap of coil 28 is connected via the No. 2 terminal of terminal strip TS' and through the resistor R4' to the cathode of vacuum tube V1A'. The oscillatory circuit including inductance coil 28 and vacuum tube V1A' is adjusted so that the system will oscillate at an appropriate frequency if but only if no iron-containing member is disposed within the coil 28 at the time that the system is energized.

Limit switch LS1 controls the time and head position at which sensing of the tool condition occurs by controlling the energization of the control means. In the illustrated arrangement, this is accomplished by utilizing the electrical contacts of limit switch LS1 to control the plate circuit of amplifier V1B'. Except for this feature, the control circuit illustrated in FIG. 12 operates identically to the control circuit illustrated in FIG. 6 and previously described and corresponding parts have been correspondingly designated with the addition of a prime symbol.

In order to supply plate voltage to vacuum tube V1B', the direct voltage appearing across filter capacitor C2' is applied via conductor 56, terminal A of terminal strip TS', conductor 58, contacts of limit switch LS1, conductor 60, terminal B of terminal strip TS', conductor 61, load resistor R2' and to the anode of tube V1B', the cathode of that tube being grounded through resistor R5'. It will be observed that the limit switch electrical contacts do not control the plate circuit for vacuum tube V2B' and consequently relays CR1' and CR2' will normally be operated even though the contacts of limit switch LS1 be open. When the head is fully retracted, the contacts of limit switch LS1 will be open and tool 16 will be spaced from the sensing coil 28. Consequently, the oscillatory circuit including vacuum tube V1A' will break into oscillation and apply an alternating-voltage signal to the control grid of vacuum tube V1B'. However, since the plate circuit for that amplifier is open at the contacts of limit switch LS1, no signal will be applied to vacuum tube V2A' or to vacuum tube V2B', and relays CR1' and CR2' will remain energized. If, at the time that the contacts of limit switch LS1 are closed, a portion of tool 16 is disposed within coil 28, the oscillatory circuit including vacuum tube V1A' will not break into oscillation and the condition of relays CR1' and CR2' will remain unchanged. However, if at the instant the contacts of limit switch LS1 are closed, no iron-containing object is disposed within coil 28 as the result of a short or broken condition of the tool, the oscillatory circuit including vacuum tube V1A' will break into oscillation, vacuum tube V1B' will apply an amplified signal to vacuum tube V2A' which will result in the application of a voltage to vacuum tube V2B' tending to drive that tube towards cutoff, and relays CR1' and CR2' will be released, producing a trouble indication.

Similar circuitry will, of course, be provided for testing the condition of tool 18.

The described arrangements have been designed to determine whether the tool is broken and whether the tool is set too short. It will be apparent that the equipment can be readily modified to permit the detection of tools which are set too long if there is a need for such a capability. For example, to detect if tool 18 is set too long, an additional limit switch can be mounted upon the base 10 in a position to be actuated by actuator A2 an appropriate distance prior to the point at which a normal length tool will enter coil 30. That additional limit switch should have a first set of normally open contacts connected in parallel with the contacts of limit switch LS1 shown in FIG. 12 of the drawings so that actuation of the additional limit switch will energize the illustrated control means by connecting plate potential to vacuum tube V1B'. In one arrangement, that additional limit switch could also be provided with a second set of normally open contacts connected in parallel with the normally open contacts of relay CR1', that is, the second set of contacts on the limit switch are connected between the No. 6 and No. 8 terminals on terminal strip TS'. This set of contacts would serve, when closed, to hold relay CR2' operated even though relay CR1' releases. The additional limit switch should further be provided with a third set of normally open contacts connected in a series including a source of energy, an additional set of normally open contacts of relays CR1', and the winding of an auxiliary relay which is preferably slow to operate, requiring a longer period to operate than relay CR1' requires to release. The auxiliary relay should be provided with a set of normally closed contacts connected in series with the machine control and in series with the No. 3 contact of relay CR2'. When the additional limit switch is actuated, the first contact thereof will energize the control means and the second contact thereof will hold relay CR2' operated. If the drill 16 is not at that instant within the coil 28, that is, if tool 16' is not set too long, the oscillatory circuit will break into oscillation and relay CR1' will be released. The release of relay CR1' will open the provided additional pair of normally open contacts of relay CR1' and prevent energization of the provided auxiliary relay. Therefore, the normally closed contacts of the auxiliary relay will not be opened and the operation of the machine control will not be interrupted. If, on the other hand, the tool 16 is too long so that its tip has entered coil 28 at the instant of this testing, the oscillatory circuit will not break into oscillation and relay CR1' will remain operated. As a result, its additional provided contacts will remain closed and an energizing circuit will be completed for the auxiliary relay due to the closure of the third set of contacts of the additional limit switch. After an appropriate interval, the auxiliary relay will operate to open its normally closed contacts and to terminate operation of the machine tool. By insuring that the additional limit switch is released prior to the time that limit switch LS1 is actuated, this additional equipment will in no way interfere with the operation of the previously described apparatus for detecting broken or short tools.

In the previously discussed arrangements, one head position-detecting means is provided for each of the two disclosed cutting tools. If both cutting tools were the same length, it would be possible to utilize but one head position-detecting means. Thus, as an example, if tools 16 and 18 in FIG. 7 of the drawings were of equal length, then both limit switches LS1 and LS2 would properly be at the same position and, accordingly, one limit switch would suffice. If the cutting tools are of different lengths, a single head position-detecting means may be employed if the tool sensing coils are staggered axially from the workpiece in accordance with the differences in the length of the cutting tools. This can be accomplished by the use of a stepped bushing plate 32' as illustrated in FIG. 13 of the drawings. In this arrangement, the distance between the tip of drill 16 and the coil 28 is equal to the distance between tool 18 and coil 30 as long as both tools 16 and 18 are unbroken and properly set. Since the tips of the two cutting tools will enter their respective coils concurrently, but a single limit switch or other head position-detecting means may be employed.

It will also be perceived that broken tools or tools that are set too short may be detected without any head position-detecting means if the sensing coils are arranged so that a normal length, unbroken cutting tool never leaves its associated coil. This may be accomplished, in one fashion, by supporting the coils upon a traveling bushing plate or upon another such member which is retracted with the head and which, as the head advances, moves therewith until it reaches the preselected relationship with the workpiece at which time the forward motion of the bushing plate terminates and the drills continue to advance into cutting relationship with the workpiece.

FIG. 14 illustrates an arrangement in which the member 32" is stationary relative to the workpiece. The coils 28 and 30 are supported within the member 32" in appropriate positions so that normal length and unbroken tools 16 and 18 are just positioned within the coils 28 and 30, respectively, when the head 12 is fully retracted. Either the head 12 or the member 32" should be movable from the operational relationship shown to a position in which the tools can be replaced.

With such an arrangement, normal length and unbroken cutting tools will never leave the coils 28 and 30 so that the control means can be continuously energized. A trouble indication will not be produced until, at some time, a portion of the drill is not disposed within one of the two sensing coils. This will occur only if the tool is missing, too short, or broken. The circuit of FIG. 12 may be modified to operate in this fashion by simply connecting a jumper across the electrical contacts of limit switch LS1 so as to short out that limit switch. It will also be obvious that the circuit of FIG. 12 may be used in its unmodified form if the limit switch is positioned to enable the circuit at the retracted position of the head.

The circuit of FIG. 15 differs from those previously described in a number of aspects. Primarily, the unit is more rapid in its operation due to the provision of a thyratron as an output device, and it is more economical where the conditions of plural drills are to be sensed concurrently in that certain of the equipment which would otherwise be individual to the several cutting tools is shared by those tools. The circuit further differs in the manner of controlling the energization of the control means.

The circuit shown in FIG. 15 includes a D.C. power supply including a transformer T2 the primary winding of which is connected (such as through suitable switching means) to a source of alternating voltage S2. The alternating voltage appearing across the secondary winding of transformer T2 is applied through a current limiting resistor R10, half-wave rectified by means of rectifier RE10 and filtered by means of capacitor C10. The direct voltage appearing between the upper terminal of capacitor C10 and ground is applied through load resistor R12 of triode V10A, through load resistor R14 to the anode of triode V10B, through load resistor R16 to the anode of triode V12A, through load resistor R18 to the anode of triode V12B and to ground through voltage divider resistors R20 and R22, the positive direct voltage appearing at the upper terminal of resistor R22 being applied to the cathode of thyratron TH.

The direct voltage appearing between the upper terminal of capacitor C10 and ground is also applied through the normally closed reset switch SW10 and through the winding of relay CR10 to the anode of thyratron TH. The positive direct voltage appearing across the capacitor C10 is also applied across a circuit including the electrical contacts of limit switch LS10, resistor R24 and resistor R26. The positive direct voltage appearing at the upper terminal of resistor R24 when the contacts of limit switch LS10 are closed is applied to the second control electrode of thyratron TH.

Vacuum tube V10A forms a part of an oscillatory circuit also including coil 28 and the capacitance of the leads interconnecting coil 28, while vacuum tube V12A forms a part of an oscillatory circuit also including coil 30 and the capacitance of the conductors interconnecting coil 30 and the vacuum tube. These circuits are connected as Hartley oscillators similar to those previously described. Coil 28 is individual to drill 16' and coil 30 is individual to drill 18', both of which are carried by head 12. Whenever drill 16' is separated from coil 28, the oscillatory circuit including coil 28 and vacuum tube V10A breaks into oscillation. The oscillatory signal is directly coupled to vacuum tube V10B, and the resulting amplified alternating voltage is applied through capacitor C12 and developed across resistor R28. The voltage across resistor R28 is half-wave rectified by means of rectifier RE12 and the resulting unidirectional voltage is developed across resistor R30 which is shunted by filter capacitor C14. The voltage appearing across resistor R30 and capacitor C14 is applied to the first control grid of thyratron TH. Rectifier RE12 is poled so that this voltage is positive relative to ground.

Thyratron TH acts as a coincidence circuit, requiring the concurrent application of appropriate direct voltages to both of the control electrodes thereof before the thyratron will fire. If limit switch LS10 is open, no direct voltage will be applied to the second control electrode of the thyratron and the thyratron will not fire even though the noted direct voltage signal is applied to the first conthol electrode thereof; however, if limit switch LS10 is closed at the time that the direct voltage signal is applied to the first control electrode, thyratron TH will conduct and operate relay CR10. Relay CR10 is provided with a set of normally open contacts adapted to be connected in series with a machine control circuit in the manner above discussed and may be provided with additional contacts for additional control purposes if desired.

In a similar manner, the oscillatory circuit including vacuum tube V12A and coil 30 will break into oscillation whenever no portion of tool 18' is disposed in proper relation with that coil, and the oscillatory signal will be amplified and rectified to produce a positive direct voltage at the first control electrode of thyratron TH, causing that thyratron to fire if, at that instant, limit switch LS10 is closed.

In the arrangement illustrated in FIG. 15, it is assumed that the two tools 16' and 18' are equal in set length and a single limit switch LS10 is correspondingly provided. The same head position-detecting arrangement may be employed even though the several cutting tools are of different lengths if, as previously noted, the axial positions of the several sensing coils are adjusted so that, at any time, the distance between each of the properly set tools and its respective coil is equal to the distance between each of the other properly set tools and their respective coils. It will further be observed that if the coils are positioned so that properly set and unbroken tools never leave their respective coils, as above discussed, then the contacts of limit switch LS10 can be jumpered, or the limit switch can be positioned at the retracted position of the head.

For clarity of illustration and exposition, the establishment of a sensing relation during the movement of the tool relative to the sensing coil has been assumed to occur at the instant that the tip of a ferrous element enters the coil, but it will be recognized that the sensing relationship can be established when the tip is spaced from the coil a preselected distance or only after a preselected amount of the element has entered the coil, as desired.

The schematic diagram of FIGS. 16 and 17 illustrates another control circuit featuring the sharing of equipment common to the plurality of cutting tool sensing units. The sensing coils are labeled 41, 43, 45, 47, 49 and 51 (FIG. 16) and it is assumed that the control system is associated with an arrangement such as that shown in FIG. 14 in which proper length unbroken tools never leave sensing relation with their respective coils.

The common points of the coils 41–51 are connected to ground, one end of coil 41 is connected to contact 2f of the stepping switch including winding 53, and the other end of the coil 41 is connected to contact 3f of the stepping switch. The free terminals of the coil 43 are connected to contacts 2g and 3g of the stepping switch, and the free ends of the other coils 45, 47, 49, and 51 are connected to stepping switch contacts 2h—3h, 2i—3i, 2j—3j and 2k—3k, respectively. Contacts 2f through 2k are contacted at appropriate times, as will be described, by movable contacts 55b of the stepping switch. When this engagement is made, a connection is established from the right-hand terminal of the selected one of the coils or inductors 41–51, conductor 57, terminal No. 2 of terminal block 59 (FIG. 17), conductor 61, through resistor 63 to the cathode of a triode 64 and directly to the control grid of a triode 66. Similarly, at corresponding times, contacts 3f to 3k of the stepping switch are engaged by movable element 55c driven in step with movable element 55b by the stepping switch. When this occurs, the corresponding left-hand terminal of coils 41–51 are connected via conductor 68, No. 3 terminal of terminal block 59, and conductor 70 to the control grid of triode 64. Vacuum tube 64 serves as the energy-supplying means of the oscillatory circuit including the several coils 41–51, vacuum tubes 66 and 72 serve as amplifying means and vacuum tube 74 controls an output relay CR12.

The D.C. power supply for the several vacuum tubes comprises a transformer 76 having a primary winding which is connected to source 78 of alternating voltage, that primary circuit being fused with fuse 80 and selectively energizable under the control of switch 82. The alternating voltage appearing across the secondary winding of transformer 76 is half-wave rectified by rectifier 84 to produce a direct voltage across filter capacitor 86. This voltage is further filtered by means of the network including resistor 88 and capacitor 90. The direct voltage appearing across capacitor 90 is applied through paralleled resistors 92 and 94, across the resistive element of variable voltage divider or potentionmeter 96 and through resistor 98 to ground. The slider of potentiometer 96 is connected to the anode of tube 64. The voltage appearing across filter capacitor 90 is also applied through load resistor 100 to the anode of vacuum tube 66, and through load resistor 102 to the anode of vacuum tube 72. The direct voltage appearing across capacitor 86 is applied through the winding of control relay CR12, shunted by capacitor 104, to the anode of triode 74.

The cathode of the oscillatory circuit triode 64 is connectable to ground through resistor 62 and through one half of the selected coil 40–50, as above traced, and the control grid of that triode is connectable to the other terminal of that selected coil, also as above traced.

It will be seen that triode 64 is connected as a Hartley type of feed-back oscillator. While the resonant circuit including inductances 40–50 may also include additional lumped inductance and lumped capacitance, it is assumed that the capacitance of the pairs of conductors extending to the coils 41–51 in the illustrated showing serves to cause the circuit to oscillate at an appropriate frequency. The circuit is arranged so that the oscillatory circuit including tubes 64 is normally quiescent, the circuit breaking into oscillation only if, at some instant of time, no portion of the drill associated with the selected coil is disposed within that coil.

When such oscillation occurs, due to a missing, broken or too short cutting tool, the alternating voltage signal appearing between the No. 2 terminal of terminal strip 59 and ground is applied between the control grid of amplifier 66 and ground. Since the anode of that tube is connected to a source of plate potential as above described and since the cathode of that tube is connected to ground through resistor 106, an amplified alternating voltage is developed across load resistor 100 which is applied to vacuum tube 72 through the coupling network comprising capacitor 108 and resistor 110. The cathode of amplifier 72 is connected to ground through resistor 112 and the tube operates as an amplifier, producing an amplified alternating voltage across load resistor 102. This alternating voltage is applied through capacitor 114 and developed across resistor 116. The alternating voltage across resistor 116 is half-wave rectified by means of rectifier 118, filtered by means of capacitor 120, and applied to the control grid of vacuum tube 74 the cathode of which is connected to ground through resistor 122. Tube 74 is normally conducting, the anode current thereof flowing through the winding of relay CR12 so that relay CR12 is normally operated. Rectifier 118 is poled so that the direct voltage which is applied between the control grid of tube 74 and ground in response to the rectification of the alternating voltage signal is negative, tending to drive tube 74 toward cutoff, thereby reducing the flow of plate current to the point where relay CR12 will release.

The voltage appearing across alternating voltage source 78 is also applied between conductors 124 and 126. This voltage is half-wave rectified (FIG. 16) by a rectifier 128 (the current through which is limited by the resistor 130 connected to conductor 124) and the resultant direct voltage is developed across and filtered by capacitor 131, the lower terminal of which is connected to conductor 126. Consequently, a positive direct voltage appears between conductor 123 and conductor 126.

When the circuit is placed in operation by the closure of switch 82 (FIG. 17), assuming a proper tool to be disposed in the head 12, relay CR12 operates to close its normally open contacts CR12b and to open its normally closed contacts CR12a. When relay CR12 operates, as aforesaid, to close its contacts CR12b, a circuit is completed from conductor 126, switch 82, conductor 134, contacts CR12b, conductor 136, terminal No. 4, conductor 138, winding of relay CR14 (shunted by capacitor 139), and resistor 140 to conductor 132, so that the direct voltage appearing between conductors 132 and 126 is applied to energize relay CR14. Relay CR14, in operating, opens its normally closed contacts CR14a (FIG. 17) and closes its normally open contacts CR14b. Contacts CR14a control the energization of an indicating light 142 as well as trouble indicating light 144, those two light being disposed in different locations if desired. Contacts CR14b control an external circuit and can be employed, for example, to actuate the machine control. The closure of contacts CR14b may be utilized as a condition of the operation of the machine tool, and the opening of those contacts can be used as a signal to shut down the machine since, as will be seen, that is an indication that a cutting tool has been found to be too short, broken or missing.

The function of the stepping switch including winding 53 is to cause the condition of the several cutting tools to be sequentially sensed each time that the head of the machine tool is in some preselected position, such as fully retracted. The stepping switch including energizing winding 53 is or may be a conventional type available on the market in which the movable elements 55a, 55b and 55c are driven by a ratchet which is stepped by a pawl, with energization of winding 53 cocking the pawl to bring it into engagement with the next tooth on the ratchet, and with deenergization of winding 53 releasing the pawl to permit it to move, under the force of a spring, to its initial position, advancing the ratchet one step in the process. The stepping switch further includes a pair of contacts 150 which serve as "off-normal" contacts. Contacts 150 are normally closed but as soon as the stepping switch movable elements 55a, 55b and 55c are stepped off of their normal position (in which they are shown), contacts 150 open and thereafter stay open until the stepping switch has completed its cycle and the movable elements 55a–55c again engage the No. 1 or normal contacts. The stepping switch is further provided with a pair of interrupter contacts 152 which are normally closed, which open at the end of each forward cocking or energized stroke of the pawl, and which reclose when the pawl is restored to its normal position.

The energization of winding 53 of the stepping switch is further controlled by the movable element 55a thereof in cooperation with contacts 1a–1k, and by a limit switch 154 (FIG. 17) controlled by the machine tool head. In the illustrated arrangement, it is assumed that the limit switch 154 is positioned to be actuated when the machine-tool head is fully retracted. The contacts of limit switch 154 are normally closed and are open only when the head is fully retracted.

When the equipment is first placed in operation, the machine-tool head is fully retracted so that contacts 154 are open. Under this same condition, contacts CR12b are closed (since relay CR12 is energized), off-normal contacts 150 are closed and interrupter contacts 152 are closed. Under these conditions, as will better be perceived from the following discussion, winding 53 will not be energized for the reason that the only possible energizing circuits therefor are open since limit switch contacts 154 are open and since movable element 55a of the stepping switch is in engagement with stepping-switch contact 1a which is not connected to conductor 138.

The stepping switch will remain in this condition until the machine-tool head is advanced. When the machine-tool head leaves its fully retracted position, limit switch contacts 154 will become closed, completing an energizing circuit for stepping-switch winding 53 which may be traced from the positive direct voltage appearing at conductor 132, resistor 156, winding 53, over one parallel path including resistor 160 and off-normal contacts 150 to conductor 158. The energizing circuit for winding 53 may then further be traced from conductor 158 (which extends to FIG. 17), the now closed contacts of limit switch 154, and to conductor 126, it being recalled that the positive direct voltage appearing across capacitor 131 (FIG. 16) appeared between conductors 132 and 126. As a result, winding 53 is energized.

A spark or transient suppression network comprising resistor 164 and capacitor 166, in series, may be connected from the junction of winding 53 and resistor 160 to the return conductor 126.

At the advancement of the pawl of the stepping switch to its fully cocked position, interrupter contacts 152 open, but since the stepping-switch movable elements 55a–55c have not yet stepped from their normal positions, contacts 150 remain closed and winding 53 remains energized. No further changes in the condition of stepping-switch 53 will occur at this time.

When the machine-tool head completes its forward and return strokes and again reaches its fully retracted position, limit-switch 154 is tripped to open the contacts thereof. This interrupts the holding circuit for stepping-switch winding 53, permitting the stepping-switch to release. In releasing, the pawl advances the ratchet one step to advance the stepping-switch movable elements 55a, 55b and 55c into engagement with contacts 1b, 2b, and 3b, respectively. In response to the de-energization of winding 53, interrupter contacts 152 reclose, and in response to the stepping of the switch from its normal position, the off-normal contacts open and remain open. Since limit switch contacts 154 are open, no energizing circuit for winding 53 can be completed therethrough at this time, but the engagement of the stepping-switch movable element 55a with contact 1b completes a circuit from the positive direct voltage at conductor 132, resistor 156, winding 53, conductor 138 (which extends to FIG. 17), No. 8 terminal of terminal block 59, conductor 136, contact CR12b, conductor 134, and switch 82 to conductor 126. The energization of winding 53 cocks the pawl to open interrupter contacts 152, to release the pawl, and to step the switch. The resultant engagement between movable element 55a and contact 1c re-establishes an energizing circuit for winding 53 so that the stepping proceeds. When the stepping has advanced to the point where movable elements 55b and 55c are in engagement with contacts 2f and 3f respectively, sensing coil 41 is connected as an element of the oscillatory circuit including tube 64, so that the condition of the cutting tool associated therewith is at that instant determined. Similarly, as the movable elements 55b and 55c successively engage the respective contacts 2g–3g through 2k–3k, the coils 43–51 are successively connected in an oscillatory circuit including tube 64 to sequentially sense the condition of the cutting tools associated with those successive coils.

When movable element 54a moves from contact 1k to contact 1a the stepping switch is returned to its normal position. Since contact 1a is not connected to conductor 138, there is no available circuit through which winding 53 may again be energized and hence the stepping switch operation terminates at this point. The apparatus is then in condition for the next machine tool cycle of operation. When the head again leaves the fully retracted position, winding 53 will be energized and will so remain until the machine-tool head returns to its fully retracted position at which time the condition of all of the cutting tools associated with the head will again be successively sensed.

If at any time during the stepping of the stepping switch, a defective tool is detected, the oscillatory circuit will break into oscillation, tube 74 (FIG. 17) will be cut off and relay CR12 will release. Relay CR12, in releasing, will open contacts CR12b to interrupt the energizing circuit for stepping-switch winding 53 to terminate its further operation. In this fashion, the information as to the defective tool is retained. The opening of contacts CR12b further opens the energizing circuit relay for CR14 (FIG. 16). The resultant closure of contacts CR14a (FIG. 17) energizes the trouble lights 142 and 144. The existence of a trouble condition is also indicated by the closure of contacts CR12a and the opening of CR14b. Either or both may be used to signal the machine control to terminate the operation of the machine, as previously discussed herein. Once the trouble condition has been detected, and relays CR12 and CR14 released, the circuit will remain in that condition, with the machine-tool held inoperative if desired, until the trouble is cured and the operation of the machine reinitiated.

While it is advantageous to sense the condition of all of the cutting tools each cycle of operation of the machine tool, it will be apparent that the circuit can be modified so that at each cycle of operation of the machine tool only the next succeeding cutting tool in the sequence is tested.

A modified circuit is shown in FIG. 18. The oscillatory circuit in the system of FIG. 18 may be the same as that illustrated in FIG. 17 of the drawings and accordingly has not been repeated. The contents of rectangle 200' in FIG. 18 should be considered as being the same as the contents of rectangle 200 in FIG. 17.

In the system of FIG. 18, two sensing coils 202 and 204 have been illustrated. It is again assumed that the cutting tools associated with these pairs of coils will never leave those coils at any point in the movement of the machine-tool head by which they are carried unless the tools are missing, too short or broken. The connection of the coils 202 and 204 to the oscillatory circuit is controlled by relay CR16 having transfer contacts CR16a and CR16b and normally open contacts CR16c. Relay CR16 is in turn controlled by a limit switch 206 which is actuated by the machine-tool head 12 and is physically positioned so that it will be actuated only when the head is fully retracted. When the head is fully retracted, limit switch 206 is closed; at all other positions of the head, limit switch 206 is open. With limit switch 206 open, relay CR16 is de-energized, and its contacts are in the position illustrated on the drawing. Under this condition, the right-hand sensing coil 202 is associated with the oscillatory circuit and the system operates as above described in connection with FIG. 17. When the head is fully retracted, limit switch 206 is closed so that if the cutting tools are proper and relay CR12 in the circuit 200' is operated, a circuit is completed to operate relay CR16. That circuit may be traced from source 208, conductor 210, winding of relay CR16, conductor 212, conductor 214, limit switch 206, conductor 216, closed contacts CR12a and back to source 208 via conductor 218. Relay CR16, in operating, switches the movable elements of its contacts CR16a and CR16b to engagement with the other one of the respective fixed contacts to associate the sensing coil 204 with the oscillatory circuit 200'. When the head advances from the fully retracted position, switch 206 opens to deenergize relay CR16 to shift the movable elements of transfer contacts CR16a and CR16b to a position to connect sensing coil 202 as a part of the oscillatory circuit. Consequently, the condition of the tool associated with coil 204 is sensed while and during the time that the head 12 is fully retracted, whereas the condition of the cutting tool associated with the coil 204 is sensed at all times that the head is not fully retracted. If the cutting tool associated with coil 202 is defective, the circuit 202' will break into oscillation, the relay CR12 will release, and contacts CR12a will open to prevent relay CR16 from being operated when the head becomes retracted. The release of relay CR12 also closes contacts CR12c and opens contacts CR12d which may be employed to energize signal lights and shut down the machine tool.

If the cutting tool associated with coil 204 is defective, that condition will be detected while relay CR16 is operated. To prevent the resultant release of relay CR12 and opening of contacts CR12a from releasing relay CR16 (which would tend to cause relay CR12 to reoperate at the trouble indication to be lost, and the machine tool to reoperate) contacts CR16c are connected in shunt of contacts CR12a so that relay CR16 will be held operated (while the head is fully retracted) despite the opening of contacts CR12a.

It will therefore be seen that in the system of FIG. 18, means are provided for sensing the condition of two separate cutting tools provided with individual sensing means but through the use of common oscillator and control circuitry. Since a relay is normally a two-state device, the condition of but two cutting tools would normally be sensed through the use of the relay circuit illustrated in FIG. 18.

It will be appreciated in connection with the arrangement of FIG. 18, that the actuating dog for the limit switch 206 may be of any length and at any location so that the period during which and place at which the condition of the cutting tool associated with the pair of coils 204 is sensed may be selected at will. The circuit of FIG. 18 is designed, however, for alternative sensing of the condition of two cutting tools.

There are certain advantages in the sharing of equipment, that is in using equipment common to the sensing of the condition of a plurality of cutting tools, and certain advantages from a mechanical and electrical standpoint to having the oscillatory circuits disposed quite close to the cutting tool. Where the oscillatory circuits are disposed in a control panel, for example, the distance between the energy-supplying (amplifier) element of the oscillatory circuit and the sensing coil may differ substantially from cutting tool to cutting tool. This can create substantial difficulties in the electrical circuitry since the capacitance of the leads between the energy-supplying element and the coils is an element of the oscillatory circuit and hence will tend to vary among the several cutting tools. Obviation of this difficulty by the use of equal-length leads means that all leads must be equal in length to the longest set.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a machine having a cutting tool for performing a cutting operation upon a workpiece and a head supporting the cutting tool and movable from a position spaced from the workpiece to a position in which the tip of the cutting tool is in cutting engagement with the workpiece, means for detecting when the length of the cutting tool is improper comprising sensing means disposed adjacent the path of travel of the cutting tool and in sensing relationship with portions of the cutting tool during the travel of the cutting tool, control means including said sensing means effective when enabled to produce a preselected output indication if a portion of the cutting tool is in sensing relation with said sensing means, and enabling means including means movable by the head for enabling said control means at a preselected position of the head.

2. The combination of claim 1, in which said preselected position is the fully retracted position of the head.

3. The combination of claim 1, in which said sensing means comprises an annular inductance coil adapted to accept and surround a portion of the cutting tool and has an effective value of inductance which differs when a portion of the cutting tool is therewithin than when the cutting tool is withdrawn from said inductance coil and in which said control means includes an oscillatory circuit having said inductance coil as an element thereof.

4. The combination of claim 3, in which said position of the head at which the tip of a proper length cutting tool is in sensing relation with said sensing means is at the fully retracted position of the head.

5. In a machine having a cutting tool for performing a cutting operation upon a workpiece and a head supporting the cutting tool and movable from a position spaced from the workpiece to a position in which the tip of the cutting tool is in cutting engagement with the workpiece, means for detecting when the length of the cutting tool is improper comprising sensing means disposed adjacent the path of travel of the cutting tool and in sensing relationship with portions of the cutting tool during the travel of the cutting tool, control means including said sensing means effective when enabled to produce a preselected output indication if a portion of the cutting tool is in sensing relation with said sensing means, and enabling means including means movable by the head for enabling said control means only when the head has moved to a position in which the tip of a proper length cutting tool is in sensing relation with said sensing means.

6. In a machine having a plurality of cutting tools for performing a plurality of cutting operations at the same time upon a workpiece and a head supporting the cutting tools and movable from a position spaced from said workpiece to a position at which the tips of the cutting tools are in cutting engagement with the workpiece, means for detecting when the length of any of the cutting tools is improper comprising a plurality of sensing means individual to the cutting tools and disposed in the paths of travel of the cutting tools and in sensing relationship with portions of the cutting tools during the travel of the cutting tools, an output device, control means including said sensing means effective when enabled to control said output device in accordance with whether portions of each of the cutting tools are in sensing relationship with the individual sensing means, and enabling means including means movable by the head for enabling said control means only when the head has moved to a position in which all of the tips of proper length cutting tools are in sensing relation with their individual sensing means.

7. The combination of claim 6, in which said position in which all of the tips are in sensing relation is the fully retracted position of the head.

8. In a machine having a cutting tool for performing a cutting operation upon a workpiece, a head supporting the cutting tool and movable from a position spaced from the workpiece to a position in which the tip of the cutting tool is in cutting engagement with the workpiece, and a bushing plate positioned proximate the workpiece and having a bushing for accepting and guiding the cutting tool during its movement into cutting engagement with the workpiece, the combination of means for detecting when the length of the cutting tool is improper comprising an annular inductance coil supported by the bushing and surrounding portions of the cutting tool when the cutting tool is disposed within the bushing, control means including said sensing means effective when enabled to produce a preselected output indication if a portion of the cutting tool is in sensing relation with said sensing means, and enabling means including means movable by the head for enabling said control means only when the head is moved to a position in which the tip of a proper length cutting tool is in sensing relation with said sensing means.

9. The combination of claim 8, in which said position in which the tip of a proper length cutting tool is in sensing relation is at the fully retracted position of the head.

10. In a machine having a plurality of cutting tools for performing cutting operations on a workpiece and a head supporting the cutting tools and movable from a first position spaced from the workpiece to a position in which the tips of the cutting tools are in cutting engagement with the workpiece, the cutting tools being of differing lengths, the combination of means for detecting when the length of any one of the cutting tools is improper comprising an inductance coil for each of the cutting tools disposed in the path of travel of the individual cutting tool and in sensing relationship with portions of the individual cutting tool during the travel of the individual cutting tool, means for supporting said inductance coils at different distances from the head when the head is the first position in accordance with the lengths of the individual cutting tools, the distance between the tip of each cutting tool and its respective inductance coil being equal when the head is in the first position to the distance between the tip of each other cutting tool and its respective inductance coil, and control apparatus including said inductance coils selectively effective to produce a preselected output indication when portions of all of the cutting tools are concurrently in sensing relation with the individual inductance coils, and a different preselected output indication when no portion of any one of the cutting tools is in sensing rotation with the inductance coil individual thereto.

11. The combination of claim 10, in which said position in which all of the tips are in sensing relation is the fully retracted position of the head.

12. In a machine having a cutting tool for performing a cutting operation upon a workpiece and a head supporting the cuttting tool and movable from a fully retracted position spaced from the workpiece to an advanced position in which the tip of the cutting tool is in cutting engagement with the workpiece, means for detecting when the cutting tool is too short comprising a hollow cylindrical inductance coil, means for supporting said inductance coil coaxially with said cutting tool in a position to allow portions of said cutting tool to pass therethrough during movement of the head to the advanced position and in surrounding and sensing relation with the tip of an unbroken tool of proper length when the head is fully retracted, output means, and control means including said inductance coil for actuating said output means effective only when the cutting tool fully leaves said inductance coil as a result of the tool being broken or set too short.

13. In a machine having a plurality of cutting tools for performing cutting operations on a workpiece and a head supporting the cutting tools and movable from a position spaced from the workpiece to a position in which the tips of the cutting tools are in cutting engagement with the workpiece, the cutting tools being of different lengths, the combination of means for detecting when the length of any one of the cutting tools is improper comprising an inductance coil for each of the cutting tools disposed in the path of travel of the individual cutting tool and in sensing relationship with portions of the individual cutting tool during the travel of the individual cutting tool, means for supporting said inductance coil at different distances from the head in accordance with the lengths of the individual cutting tools, the distance between the tip of each cutting tool and its respective inductance coil being equal to the distance between the tip of each other cutting tool and its respective inductance coil, control means including said sensing means effective when enabled to produce a preselected output indication only if portions of all of the cutting tools are in sensing relation with the individual sensing means, and single enabling means including means movable by the head for enabling said control means at a preselected position of the head.

14. The combination of claim 13, in which said preselected position is the fully retracted position of the head.

15. In a machine having a cutting tool for performing a cutting operation upon a workpiece and a head supporting the cutting tool and movable from a fully retracted position spaced from the workpiece to an advanced position in which the tip of the cutting tool is in cutting engagement with the workpiece, means for detecting when the length of the cutting tool is improper comprising sensing means disposed adjacent the line of travel of the cutting tool and in critical sensing relationship with the tip portion of the cutting tool at a preselected position of the head, control means including said sensing means effective when enabled to produce one preselected output indication if a portion of the cutting tool is in sensing relation with said sensing means when the head is at said preselected position, and enabling means including means movable by the head for enabling said control means at said preselected position of the head.

16. The combination of claim 15, in which said preselected position is the fully retracted position of the head.

17. In a machine having a cutting tool for performing a cutting operation upon a workpiece and a head supporting the cutting tool and movable from a fully retracted position spaced from the workpiece to an advanced position in which the tip of the cutting tool is in cutting engagement with the workpiece, means for detecting when the length of the cutting tool is improper comprising sensing means disposed adjacent the line of travel of the cutting tool and in critical sensing relationship with the tip portion of the cutting tool at a preselected position of the head, and control means including said sensing means effective to produce one preselected output indication if a portion of the cutting tool is in sensing relation with said sensing means when the head is at said preselected position and effective to produce a different preselected output indication if no portion of the cutting tool is in sensing relation with said sensing means when the head is at said preselected position.

18. The combination of claim 17, in which said sensing means is an annular inductance coil adapted to accept and surround a portion of the cutting tool and having an effective value of inductance which differs when a portion of the cutting tool is therewithin than when the cutting tool is withdrawn from said inductance coil, and in which said control means includes an oscillatory circuit having said inductance coil as an element thereof.

19. The combination of claim 18, further including bushing plate means disposed between the head and the workpiece and having an aperture for accepting the cutting tool for guiding the cutting tool during the travel thereof towards the workpiece, and in which said inductance coil is supported by said bushing plate coaxially with said aperture.

20. In a machine having a cutting tool for performing a cutting operation upon a workpiece and a head supporting the cutting tool and movable from a fully retracted position spaced from the workpiece to an advanced position in which the tip of the cutting tool is in cutting engagement with the workpiece, means for detecting when the length of the cutting tool is improper comprising sensing means disposed adjacent the line of travel of the cutting tool and in critical sensing relationship with the tip portion of the cutting tool at the fully retracted position of the head, control means including said sensing means effective to produce one preselected output indication if a portion of the cutting tool is in sensing relation with said sensing means when the head is at said fully retracted position and effective to produce a different preselected output indication if no portion of the cutting tool is in sensing relation with said sensing means when the head is at said fully retracted position.

21. The combination of claim 20, in which said sensing means is an annular inductance coil adapted to accept and surround a portion of the cutting tool and having an effective value of inductance which differs when a portion of the cutting tool is therewithin than when the cutting tool is withdrawn from said inductance coil.

22. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools including means disposed adjacent the line of travel of the individual cutting tool and in critical sensing relationship with the tip portion of the individual cutting tool at a preselected position of the head, common control means connectable to any one of said sensing means and effective to produce a preselected output indication if no portion of a cutting tool is disposed in sensing relation with said any one of said sensing means at a time that said any one of said sensing means is connected to said control means, and means for successively connecting said sensing means to said common control means.

23. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools including means disposed adjacent the line of travel of the individual cutting tool and in critical sensing relationship with the tip portion of the individual cutting tool at a preselected position of the head, common control means connectable to any one of said sensing means and effective to produce a preselected output indication if no portion of a cutting tool is disposed in sensing relation with said any one of said sensing means at a time that said any one of said sensing means is connected to said control means, and means effective each time that the head reaches a preselected position during each cycle of operation for successively connecting said sensing means to said common control means.

24. The combination of claim 23, in which said preselected position is said fully retracted position.

25. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools, each of said sensing means including an inductance coil disposed adjacent the line of travel of the individual cutting tool and in critical sensing relationship with the tip portion of the individual cutting tool at a preselected position of the head, common control means connectable to any one of said sensing means and effective to produce a preselected output indication if no portion of a cutting tool is disposed in sensing relation with said any one of said sensing means at a time that said any one of said sensing means is connected to said control means, and means including means actuated each time that said head reaches a preselected position during said cyclic operation for successively connecting said sensing means to said common control means.

26. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools including means disposed adjacent the line of travel of the individual cutting tool and in critical sensing relationship with the tip portion of the individual cutting tool at a preselected position of the head, common control means connectable to any one of said sensing means and effective to produce a preselected output indication if no portion of a cutting tool is disposed in sensing relation with said any one of said sensing means at a time that said any one of said sensing means is connected to said control means, relay means effective when in an operated condition to connect one of said sensing means to said common control means and effective when in a released condition to connect a different one of said sensing means to said common control circuit, and means controlled by the position of the head for controlling the operation of said relay means.

27. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools disposed adjacent the line of travel of the individual cutting tool and in critical sensing relationship with the tip portion of the individual cutting tool at a preselected position of the head, common control means connectable to any one of said sensing means and effective to produce a preselected output indication if no portion of a cutting tool is disposed in sensing relation with said any one of said sensing means at a time that said any one of said sensing means is connected to said control means, relay means effective when in an operated condition to connect one of said sensing means to said common control means and effective when in a released condition to connect a different one of said sensing means to said common control circuit, and means controlled by the position of the head and effective each cycle of operation of the head to operate and release said relay means.

28. The combination of claim 27, further including means responsive to said output indication for preventing a further change of condition of said relay means.

29. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools including means disposed adjacent the line of travel of the individual cutting tool and in critical sensing relationship with the tip portion of the individual cutting tool at a preselected position of the head, common control means connectable to any one of said sensing means and effective to produce a preselected output indication if no portion of a cutting tool is disposed in sensing relation with said any one of said sensing means at a time that said any one of said sensing means is connected to said control means, and stepping means effective when actuated to successively connect said sensing means to said common control means in a preselected sequence.

30. The combination of claim 29, further including means effective each cycle of operation of the head for actuating said stepping means.

31. The combination of claim 29, further including means effective each time the head reaches said fully retracted position for actuating said stepping means.

32. The combination of claim 31, further including means responsive to said output indication for terminating the operation of said stepping means.

33. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools disposed adjacent the line of travel of the individual cutting tool and in critical sensing relationship with the tip portion of the individual cutting tool at a preselected position of the head, common control means including single oscillatory circuit means selectively including any one of said sensing means and output means, said oscillatory circuit changing condition if no portion of a cutting tool is disposed in sensing relation with said any one of said sensing means at a time that said oscillatory circuit means includes said any one of said sensing means, said output means being effective in response to said change of condition of said oscillatory circuit to produce an output indication, and means for successively connecting said sensing means to said oscillatory circuit means.

34. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools disposed adjacent the line of travel of the individual cutting tool and in critical sensing relationship with the tip portion of the individual cutting tool at a preselected position of the head, common control means including single oscillatory circuit means selectively including any one of said sensing means and output means, said oscillatory circuit changing condition if no portion of a cutting tool is disposed in sensing relation with said any one of said sensing means at a time that said oscillatory circuit means includes said any one of said sensing means, said output means being effective in response to said change of condition of said oscillatory circuit to produce an output indication, means for successively connecting said sensing means to said oscillatory circuit means comprising a relay effective when operated to connect one of said sensing means to said oscillatory circuit means and effective when released to connect another one of said sensing means to said oscillatory circuit means, and means controlled by the movement of the head for controlling the actuation of said relay.

35. In a machine having a plurality of cutting tools for performing cutting operations upon a workpiece and a head supporting the cutting tools and cyclically movable from a fully retracted position spaced from the workpiece to an advanced position in which the cutting tools are in cutting engagement with the workpiece, means for detecting when the length of any one of the cutting tools is improper comprising sensing means individual to each of the cutting tools disposed adjacent the line of travel of the individual cutting tool and in critical sensing relationship with the tip portion of the individual cutting tool at a preselected position of the head, common control means including single oscillatory circuit means selectively including any one of said sensing means and output means, said oscillatory circuit changing condition if no portion of a cutting tool is disposed in sensing relation with said any one of said sensing means at a time that said oscillatory circuit means includes said any one of said sensing means, said output means being effective in response to said change of condition of said oscillatory circuit to produce an output indication, means for successively connecting said sensing means to said oscillatory circuit means comprising a stepping switch effective when actuated to successively connect said sensing means and said oscillatory circuit means in a preselected sequence, and means for actuating said stepping switch each time the head is in its fully retracted position.

References Cited in the file of this patent

UNITED STATES PATENTS 2,807,720    Charles _____ Sept. 24, 1957

OTHER REFERENCES

Clar, German application 1,033,991, printed July 10, 1958 (Kl. 49a 55/01), 2 pp. spec., 1 sht. dwg.